(12) United States Patent
Zimny et al.

(10) Patent No.: US 10,607,012 B2
(45) Date of Patent: Mar. 31, 2020

(54) BRIDGE COMPUTING DEVICE CONTROL IN LOCAL NETWORKS OF INTERCONNECTED DEVICES

(71) Applicant: Delphian Systems, LLC, Buffalo Grove, IL (US)

(72) Inventors: Arkadiusz Zimny, Hampshire, IL (US); Ashok Hirpara, Carol Stream, IL (US); Thomas D. Johnson, Poplar Grove, IL (US)

(73) Assignee: Delphian Systems, LLC, Buffalo Grove, IL (US)

( * ) Notice: Subject to any disclaimer, the term of this patent is extended or adjusted under 35 U.S.C. 154(b) by 118 days.

(21) Appl. No.: 15/858,093

(22) Filed: Dec. 29, 2017

(65) Prior Publication Data
US 2019/0205541 A1    Jul. 4, 2019

(51) Int. Cl.
*G06F 21/57* (2013.01)
*H04L 12/12* (2006.01)
(Continued)

(52) U.S. Cl.
CPC .......... *G06F 21/575* (2013.01); *G06F 9/4406* (2013.01); *H04L 12/12* (2013.01);
(Continued)

(58) Field of Classification Search
CPC ............... G06F 21/575; G06F 9/4406; G06F 2221/034; H04L 63/0428; H04L 41/0806; H04L 12/12; H04L 67/26
See application file for complete search history.

(56) References Cited

U.S. PATENT DOCUMENTS 7,626,944 B1   12/2009  Riddle
2008/0263647 A1 10/2008  Barnett et al.
(Continued)

FOREIGN PATENT DOCUMENTS

JP        2010288026 A    12/2010

OTHER PUBLICATIONS

"Secure Enterprise Mesh." Retrieved from [http://www.arubanetworks.com/techdocs/ArubaOS_60/UserGuide/Mesh.php] on May 7, 2017.
(Continued)

*Primary Examiner* — Austin J Moreau
(74) *Attorney, Agent, or Firm* — Banner & Witcoff, Ltd.

(57) ABSTRACT

Systems, methods, and apparatus for using a message broker that implements a publish-subscribe messaging protocol to exchange messages between a remote server and a bridge computing device of a local network of interconnected devices are disclosed. In one example, a bridge computing devices transmits to a remote server, a provisioning request in response to achieving a power-on state. The server generates and transmits, to the bridge computing device, a provisioning response that includes information indicating a channel to which the remote server will publish messages and a channel to which the bridge computing device should publish messages. The bridge computing device subscribes to the channel the server will publish to, and the server subscribes to the channel the bridge computing device will publish to. Third-party computing devices may also subscribe and publish to the channels in order to receive and provide messages to the bridge computing device.

27 Claims, 12 Drawing Sheets

(51) Int. Cl.
  *H04L 12/24* (2006.01)
  *G06F 9/4401* (2018.01)
  *H04L 29/06* (2006.01)
  *H04W 4/50* (2018.01)
  *H04L 12/26* (2006.01)
  *H04L 29/08* (2006.01)
  *H04W 4/70* (2018.01)

(52) U.S. Cl.
  CPC ...... *H04L 41/0806* (2013.01); *H04L 41/0893* (2013.01); *H04L 43/0811* (2013.01); *H04L 63/0428* (2013.01); *H04W 4/50* (2018.02); *G06F 2221/034* (2013.01); *H04L 67/26* (2013.01); *H04W 4/70* (2018.02)

(56) References Cited

U.S. PATENT DOCUMENTS

| | | |
|---|---|---|
| 2009/0138713 A1 | 5/2009 | Veillette |
| 2009/0213730 A1 | 8/2009 | Zeng et al. |
| 2011/0060822 A1 | 3/2011 | Fan et al. |
| 2011/0066875 A1 | 3/2011 | Fan et al. |
| 2011/0103392 A1 | 5/2011 | Fan et al. |
| 2011/0258296 A1 | 10/2011 | Garrison Stuber et al. |
| 2011/0310770 A1 | 12/2011 | Liang et al. |
| 2012/0051211 A1 | 3/2012 | Budampati et al. |
| 2012/0092984 A1 | 4/2012 | Mighani et al. |
| 2012/0117213 A1 | 5/2012 | Shaffer et al. |
| 2012/0180106 A1 | 7/2012 | Baskerville et al. |
| 2013/0016654 A1 | 1/2013 | Mayo et al. |
| 2013/0197955 A1 | 8/2013 | Dillon |
| 2013/0208627 A1 | 8/2013 | Picard |
| 2014/0129838 A1 | 5/2014 | Kim et al. |
| 2014/0167978 A1 | 6/2014 | Popa et al. |
| 2014/0211939 A1 | 7/2014 | Holmdahl |
| 2014/0219103 A1 | 8/2014 | Vasseur et al. |
| 2014/0226667 A1 | 8/2014 | Veillette |
| 2014/0317614 A1 | 10/2014 | Djabarov et al. |
| 2014/0358734 A1 | 12/2014 | Sehgal et al. |
| 2015/0023174 A1 | 1/2015 | Dasgupta et al. |
| 2015/0245182 A1 | 8/2015 | Scagnol et al. |
| 2016/0134605 A1 | 5/2016 | Cregg |
| 2016/0182306 A1 | 6/2016 | Liu |
| 2016/0330182 A1 | 11/2016 | Jeon et al. |
| 2016/0337478 A1 | 11/2016 | Osterloh et al. |
| 2016/0380872 A1 | 12/2016 | Halvarsson et al. |
| 2017/0019828 A1 | 1/2017 | Purohit |
| 2017/0034191 A1 | 2/2017 | Lee et al. |
| 2017/0055156 A1 | 2/2017 | Myers et al. |
| 2017/0118705 A1 | 4/2017 | Tran et al. |

OTHER PUBLICATIONS

"Manage Wireless Mesh Networks." Retrieved from [http://www.pmr.ee/wg/wgcloudhelp/Content/en-US/manage_wirelessmanager/configuration/wifi_access/mesh_profiles.html] on May 7, 2017.

"MQTT" Retrieved from [https://en.wikipedia.org/wiki/MQTT] on Dec. 21, 2017.

"Publish-subscribe pattern." Retrieved from [https://en.wikipedia.org/wiki/Publish%E2%80%93subscribe_pattern] on Dec. 21, 2017.

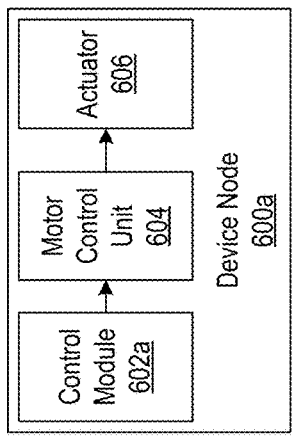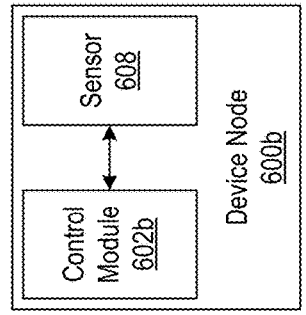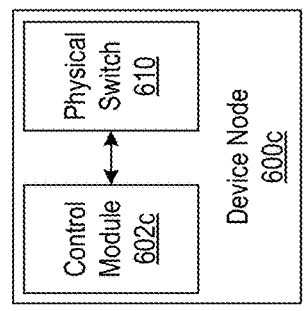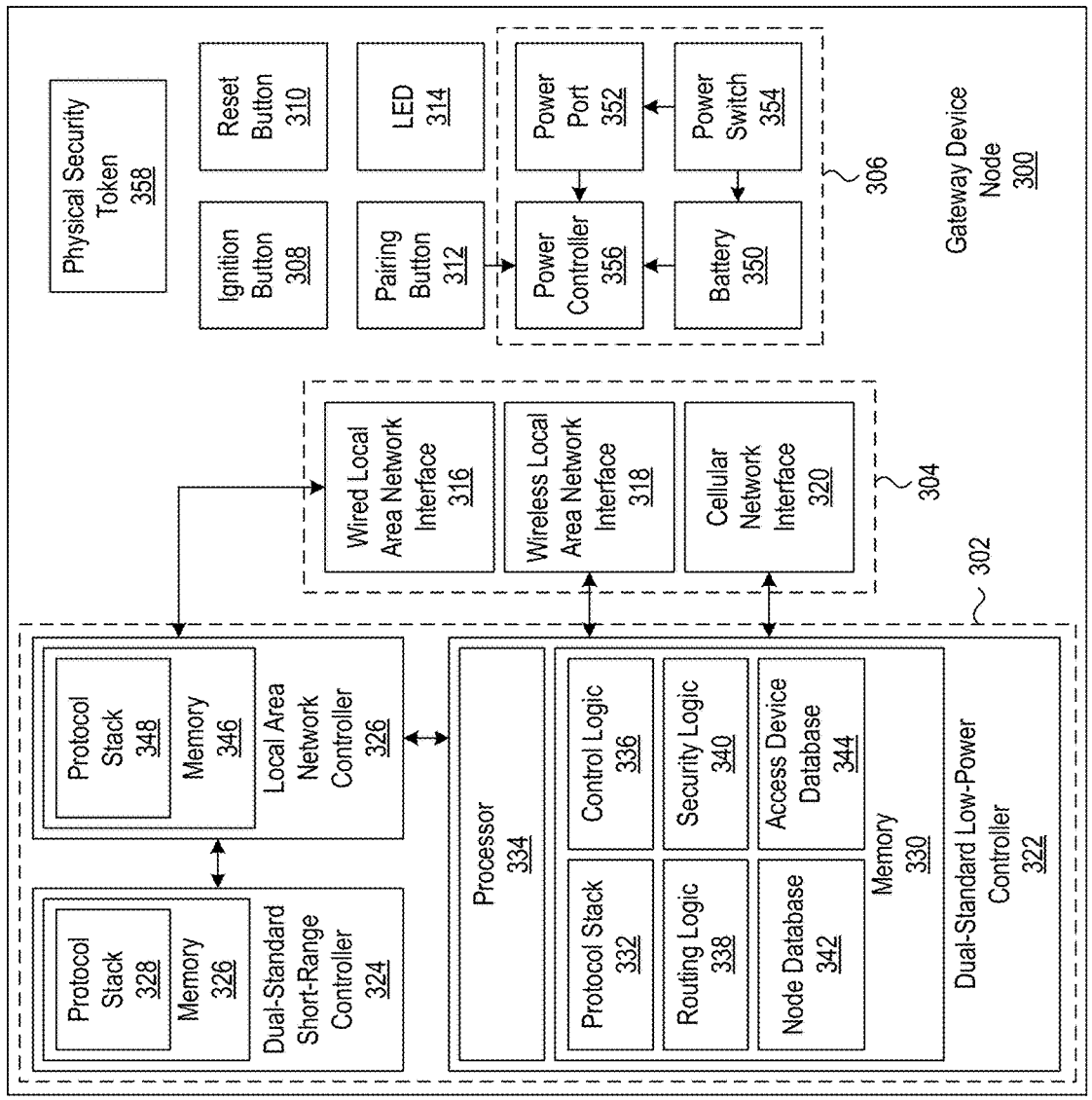

BRIDGE COMPUTING DEVICE CONTROL IN LOCAL NETWORKS OF INTERCONNECTED DEVICES

TECHNICAL FIELD

The present disclosure is generally related to network communications and is particularly directed toward bridge computing device control in local networks of interconnected devices.

BACKGROUND

The proliferation of network-enabled devices continues to grow in terms of both volume and type. The "Internet of Things" (or IoT) refers to the collection of devices (e.g., "smart devices"), objects (e.g., "smart objects"), and sensors having networking capabilities. IoT principles are applied in a variety of areas such as, for example, home automation. It is estimated that within a few years, the average household will include dozens of network-enabled devices and the worldwide total of network-enabled devices will reach tens of billions.

As with traditional computing, the security of such devices is a concern. The introduction of new types of network-enabled devices introduces new challenges with respect to securing those devices. Such challenges include, among others, determining which individuals are authorized to interact with a device and determining what interactions an individual is authorized to perform. Additional challenges include how to securely communicate between devices of a network and/or with third-party devices. Furthermore, different types of devices may implicate different security concerns. In some examples, adding new devices to a network can affect security, among other characteristics. While some devices may only transmit information that is read and/or collected by other devices (e.g., sensor-type devices) thus implicating relatively minor security concerns, other devices may provide and/or house sensitive information or be user-controlled thus implicating relatively major security concerns. As a result, new solutions to provide security for network-enabled devices are needed.

SUMMARY

To overcome the challenges described above, methods, systems, and apparatuses to provide power-on provisioning, third-party messaging, load balancing, and bridge transitioning are disclosed.

An example system in accordance with aspects described herein includes a bridge device and a server. In response to achieving a power-on state, the bridge device transmits a provisioning request to the server. In response to receiving the provisioning request, the server generates a provisioning response that includes information indicating a first channel to which the server will publish its messages and a second channel to which the bridge device should publish its messages. The server also subscribes to that second channel so as to receive messages published by the bridge device. In response to receipt of the provisioning response, the bridge device subscribes to the first channel so as to receive messages published by the server. Additional aspects and features will be appreciated upon review of the additional disclosures below.

This summary is not intended to identify critical or essential features of the disclosures herein, but instead merely summarizes certain features and variations thereof. Other details and features will also be described in the sections that follow.

BRIEF DESCRIPTION OF THE DRAWINGS

Some features herein are illustrated by way of example, and not by way of limitation, in the figures of the accompanying drawings and in which like reference numerals refer to similar elements. It is to be appreciated that the figures, as shown herein, are not necessarily drawn to scale, wherein some of the elements may be drawn merely for the purpose of clarity. Also, reference numerals may be repeated among the various figures to show corresponding or analogous elements.

FIG. 3 depicts an example of an implementation of a gateway device node in accordance with aspects described herein.

FIG. 6A depicts an example of an implementation of a first type of device node in accordance with aspects described herein.

FIG. 6B depicts an example of an implementation of a second type of device node in accordance with aspects described herein.

FIG. 6C depicts an example of an implementation of a device node in accordance with aspects described herein.

DETAILED DESCRIPTION

Figure 1:
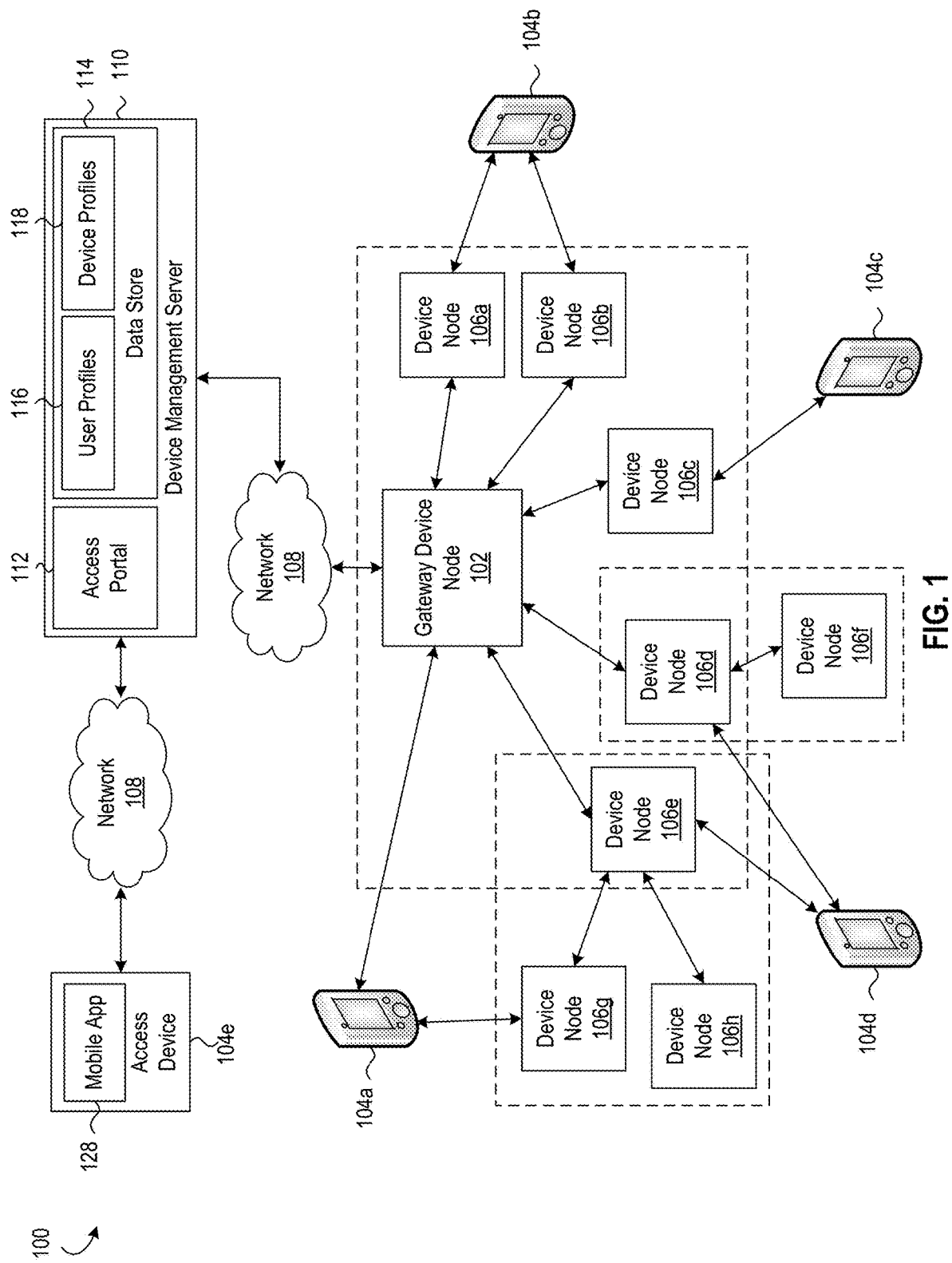
FIG. 1 depicts an example of an implementation of a local network of interconnected devices in accordance with aspects described herein.

The disclosures below provide a plurality of exemplary methods, systems, and apparatus that provide power-on provisioning, third party messaging, load balancing, bridge transitioning in networks of interconnected devices.

In some examples, a scalable and secure message delivery system is provided by initiating an encrypted publish-subscribe model upon a bridge device powering-on. In some examples, the initial communications are encrypted and sent directly between a bridge device and a server. Subsequently, a message broker may maintain secure channels for encrypted communications between those devices. Such communications enable secure provisioning of commands and authentication information with any number of users or devices, provided that the users or devices have access to encryption keys used to encrypt the communications. In some circumstances, third-party users or devices do not have access to the encryption keys used to encrypt the communications. In other circumstances, third-party users may be authorized and provided with the encryption keys to "listen in" on and/or publish their own messages on the secure channels. For example, third-parties may be authorized to perform diagnostic monitoring, analyze sensor data, initiate one or more commands, etc. In some examples, new device nodes are introduced into a mesh network including the bridge device. However, the mesh network may need reconfiguring or load balancing to continue to perform as disclosed herein. In some examples, one or more secondary bridge devices may exist in the mesh network to provide back-up capabilities.

An exemplary system according to the teachings disclosed herein may comprise a first computing device configured to connect a local network of interconnected devices to a wide area network (WAN). The first computing device may include one or more processors and corresponding memory to store instructions executable by the one or more processors. When the instructions are executed, the computing device may, among other things, transmit a provisioning request to a second computing device. In some examples, the first computing device transmits the provisioning request in response to achieving a power-on state. The second computing device may be in signal communication with the first computing device, and may itself comprise one or more processors and corresponding memory to store instructions executable by the one or more processors. When the instructions are executed, the second computing device may, among other things, receive the provisioning request from the first computing device, and generate a provisioning response. The provisioning response may comprise information indicating a first channel to which the first computing device is to publish one or more first messages, and information indicating a second channel to which the second computing device is to publish one or more second messages. The first and second channels may be provided by a message broker that implements a publish-subscribe messaging protocol. The second computing device may further subscribe to the first channel and transmit the provisioning response to the first computing device. The first computing device may subscribe to the second channel in response to receipt of the provisioning response.

In some examples, the first computing device of the above described system may transmit an identifier to the second computing device. Based on the transmitted identifier, the second computing device may identify a device-specific encryption key associated with the first computing device.

In some examples, the second computing device determines a timeframe for which the first channel or the second channel is available for publication or subscription.

In some examples, the second computing device transmits information indicating a channel to which the first computing device is to publish one or more messages to a third computing device, and receipt of that information by the third computing device causes the third computing device to subscribe to the channel.

In some examples, the channel to which the first computing device is to publish the one or more messages is the first channel to which the first computing device is to publish the one or more first messages.

In some examples, the second computing device transmits a device-specific encryption key associated with the first computing device to a third computing device.

In some examples, the first computing device publishes a message to a channel provided by the message broker, which causes the third computing device decrypt, with the device-specific encryption key, at least a portion of the message that the first computing device has encrypted using the device-specific encryption key.

In response to publication of a message by the third computing device to a channel provided by the message broker, the first computing device decrypts, using the device-specific encryption key, at least a portion of the message that the third computing device has encrypted using the device-specific encryption key.

In some examples, the first computing device encrypts at least a portion of a first message of the one or more first messages using a device-specific encryption key associated with the first computing device in order to obtain an encrypted message, which the first computing device then publishes to the first channel. In some such examples, the portion of the first message that is encrypted using the device-specific encryption key comprises a payload of the first message.

In some examples, the second computing device encrypts at least a portion of a second message of the one or more second messages using a device-specific encryption key associated with the first computing device in order to obtain an encrypted message, which the second computing device publishes to the second channel.

In some examples, the first computing device publishes a first message of the one or more first messages to the first channel, and the second computing device publishes a second message of the one or more second messages to the second channel.

An exemplary method according to the teachings disclosed herein may comprise a first computing device receiving, in response to a second computing device achieving a power-on state, a provisioning request, wherein the second computing device is configured to connect a local network of interconnected devices to a wide area network (WAN). The first computing device may begin generating, in response to receipt of the provisioning request, a provisioning response, which comprises information indicating a first channel to which the first computing device is to publish one or more first messages, and information indicating a second channel to which the second computing device is to publish one or more second messages. In some examples, the first and second channels are provided by a message broker that implements a publish-subscribe messaging protocol. The first computing device may begin transmitting, to the second computing device, the provisioning response wherein receipt of the provisioning response by the second computing device causes the second computing device to subscribe to the first channel. Similarly, the first computing device may subscribe to the second channel. Once the second computing device is subscribed to the first channel, the first computing device may begin publishing, to the first channel, a message of the one or more first messages.

In some examples, the first computing device may begin transmitting, to a third computing device, a device-specific encryption key associated with the second computing device.

In some examples, the first computing device receives, from the second computing device, information indicating a plurality of message types that the second computing device is to publish.

In some examples, the first computing device begins transmitting, to the second computing device, information indicating a timeframe for which the first channel or the second channel is available for publication or subscription.

In some examples, the first computing device receives a message of the one or more second messages published to the second channel by the second computing device. The first computing device begins decrypting, by the first computing device and using a device-specific encryption key associated with the second computing device, at least a portion of the message that the second computing device has encrypted using the device-specific encryption key.

In some examples, the first computing device encrypts, using a device-specific encryption key associated with the second computing device, at least a portion of a message of the one or more first messages in order to obtain an encrypted message, and publishes the encrypted message to the first channel.

An exemplary method according to the teachings disclosed herein may comprise a first computing device configured to connect a local network of interconnected devices to a wide area network (WAN) achieving a power-on state, and, in response to achieving the power-on state, transmitting, to a second computing device and a provisioning request. The first computing device may receive a response to the provisioning request from the second computing device. The response may comprise information indicating a first channel to which the first computing device is to publish one or more first messages, and information indicating a second channel to which the second computing device is to publish one or more second messages. In response to receipt of the provisioning response, the first computing device may subscribe to the second channel and may publish a message to the first channel.

In some examples, the first computing device begins encrypting, with a device-specific encryption key associated with the first computing device, at least a portion of a message of the one or more first messages to obtain an encrypted message, which the first computing device publishes to the first computing channel.

In some examples, the first computing device receives a message of the one or more second messages published to the second channel, and decrypts, with a device-specific encryption key associated with the first computing device, at least a portion of the message that has been encrypted using the device-specific encryption key.

In some examples, the second computing device published the message to the second channel. In some examples, a third computing device published the message to the second channel.

In some examples, the first computing device transmits information indicating a plurality of message types that the first computing device is to publish to the second computing device.

In some examples, the bridge device notifies, via a low-power protocol, a back-up/failover bridge device to replace the bridge device.

In some examples, the system further includes a broker device, wherein the broker device provides the first channel and the second channel.

In some examples, the transmitting of the device-specific encryption key occurs in response to the validating.

In some examples, the method further includes receiving, from the gateway device, a first encryption key, determining an identifier of the gateway device, identifying, based on the identifier of the gateway device, a second encryption key, and decrypting, based on the first encryption key and based on the second encryption key, the provisioning request.

In some examples, the method further includes receiving, from the gateway device, information indicating a provisioning service protocol version for the provisioning request, the provisioning response, and the provisioning message.

In some examples, the method further includes notifying, via a low-power protocol, a secondary gateway device to replace the gateway device.

For convenience the following terminology is adopted herein. A local network of interconnected devices as used herein refers to at least two devices that are in signal communication with each other using at least one of a short-range wireless communication standard or a low-power wireless communication standard. The local network of interconnected devices may also include additional devices in signal communication with one or more devices of the network and configured to employ other wired and/or wireless communication standards. A device node as used herein refers to one of the devices of a local network of interconnected devices. A gateway device node as used herein refers to a device of a local network of interconnected devices that is configured for communicating via a wide area network (WAN)—such as the Internet and/or a cellular network—and for communicating with another one of the device nodes of the network. The gateway device node may also function as the hub of the local network of interconnected devices. The gateway device node may also be referred to as a bridge device node in view of the functionality it provides to bridge the local network and a WAN.

The device nodes of the network may be categorized based on their physical proximity to a gateway device node of the network. A zero-level device node as used herein refers to a device node that is located within the wireless range of the gateway device node, i.e., capable of receiving wireless communications transmitted from the gateway device node and/or capable of transmitting wireless communications that will be received at the gateway device node. A first-level device node as used herein refers to a device node that is located outside the wireless range of a gateway node but is located within the wireless range of a zero-level device node. A second-level device node as used herein refers to a device node that is located outside of the wireless range of a gateway device node and the wireless range of a zero-level device node but is located within the wireless range of a first-level device node. Zero-level device nodes are thus in direct signal communication with a gateway device node and may exchange point-to-point wireless communications. First-level device nodes and second-level device nodes are thus in indirect signal communication with a gateway device node, and communications may be routed to first-level device nodes and second-level device nodes via other device nodes of the network.

The device nodes of a local network of interconnected devices may also be deployed in a master/slave configuration. A master device node as used herein refers to a device node that issues commands to another device node. A slave device node as used herein refers to a device node that receives commands from a master device node. A relay device node as used herein refers to a device node that routes a communication between two other device nodes. Although the network of interconnected devices is referred to as a local network of interconnected devices, a device node that is located remotely relative to another device node of the network may communicate with that device node via a WAN (such as the Internet) as described in further detail below.

The device nodes of the local network of interconnected devices are configured to utilize one or more of the following communication standards: wired LAN communication standards; wireless LAN communication standards; cellular communication standards; short-range wireless communication standards; and low-power wireless communication standards. Examples of wired LAN standards include the IEEE 802.3 family of Ethernet standards. Examples of wireless LAN standards include the IEEE 802.11 family of wireless LAN standards commonly known as "Wi-Fi." Examples of cellular communication standards include any of the 2G, 3G, or 4G generation of cellular communication standards. Examples of short-range communication standards include the IEEE 802.15 family of wireless communication standards which include implementations commonly known as Bluetooth Classic developed by the Bluetooth Special Interest Group (SIG), ZigBee developed by the ZigBee Alliance, and any of the near-field communication (NFC) standards developed by the NFC Forum. Short-range wireless communication standards may permit maximum wireless ranges of about 1 meter (m) to about 100 m (i.e., about 3.3 feet (ft) to about 330 ft) depending on transmission power. Examples of low-power wireless communication standards include Bluetooth low energy (also known as Bluetooth LE, BLE, and Bluetooth Smart) also developed by the Bluetooth SIG and include ANT developed by Dynastream Innovations Inc. Accordingly low-power wireless communication standards include those that exhibit a peak power consumption of about 10 milliamps (mA) to about 30 mA when employed to transmit and/or receive wireless communications.

One or more device nodes of the local network of interconnected devices may also be referred to as a low-power device. As used herein, low-power devices include those that, when active and consuming at least some power, are configured to toggle between a sleep mode and an awake mode where the device consumes significantly less power while in the sleep mode relative to the power consumed while in the awake mode. In some example implementations, the power consumed by an example low-power device during a sleep mode may differ from the power consumed during an awake mode by an order of magnitude—e.g., the device may consume power on a scale of microamps (μA) during a sleep mode and consume power on a scale of milliamps during an awake mode. In one particular example, a low-power device may receive a power supply voltage of 3 volts (V) and exhibit the following power consumption characteristics. While in a sleep mode, this example low-power device may exhibit a power consumption of about 0.6 μA with no retention of data in volatile memory, a power consumption of about 1.2 μA with 8 kilobytes (kB) of data retention in volatile memory, and a power consumption of about 1.8 μA with 16 kB of data retention in volatile memory. While in an awake mode, this example low-power device may exhibit a power consumption of about 2.6 μA during periods of relatively low activity at a controller, a power consumption of about 10.5 mA during transmission of a wireless signal at about 0 dBm, and a peak power consumption of about 13 mA during reception of a wireless signal. It will be appreciated that the values provided above are provided by way of example only and that other low-power devices may exhibit different power consumption profiles.

A dual-mode device node as used herein refers to a device node configured to wirelessly communicate using at least two low-power wireless communication standards (e.g., both ANT and BLE). A multi-mode node as used herein refers to a device node configured to wirelessly communicate using at least two low-power wireless communication standards (e.g., both ANT and BLE) as well as at least one other wired or wireless communication standard (e.g., a short-range wireless communication standard, a cellular communication standard, a wired LAN communication standard, and/or a wireless LAN communication standard). It will be recognized that the local network of interconnected devices may, in some circumstances, be or include a personal area network (PAN) where the device nodes of the network are logically associated with an individual user and communicate over relatively short distances. A local area network of interconnected devices may thus include multiple PANs each respectively associated with a particular user, e.g., each the individual of a household.

An access device as used herein refers to a user-operated device node that is configured to interact with other device nodes in the local network of interconnected devices. Examples of access devices include computing devices (e.g., mobile cellular telephones, palmtop computing devices, tablet computing devices, laptop computing devices, desktop computing devices, video game machines, network-enabled televisions, and the like), miniature remotes (e.g., keyfobs), and other types of devices having at least one communication interface configured for communicating with one or more types of devices nodes of a local network of interconnected devices either directly or indirectly via one or more device nodes and/or via local and/or remote computing devices. As described in further detail below, access devices include instructions that, when executed at the access device, cause the access device to wirelessly communicate with device nodes of a local network of interconnected devices. Some of the instructions cause the access device to accept input from the user such that the access device initiates communications to device nodes responsive to and based on that input. Other instructions cause the access device to provide output to the user responsive to and based on communications received from devices nodes. The instructions may reside in non-volatile memory at the access device, and those instructions may or may not be updatable. In some examples, those instructions may be implemented as an application installed at the access device.

As described in further detail below device nodes may pair and bond with each other when in direct signal communication. As used herein, pairing refers to the process of discovering a device, exchanging device information, and exchanging communications during a temporary communication session. As also used herein, bonding refers to the process of exchanging long-term keys between paired devices such that those devices may subsequently pair automatically when those devices are within their respective wireless ranges. In some examples, bonding may include a standard Bluetooth bonding procedure. In other examples, bonding may include the procedures used to establish communication sessions as described in commonly-owned U.S. Pat. No. 9,407,624, which is incorporated herein by reference.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging. In addition a "set" as used in this description refers to a collection of one or more elements. Furthermore non-transitory computer-readable media refer to all types of computer-readable media with the sole exception being a transitory propagating signal.

Networks of Interconnected Devices

Referring now to FIG. 1, an example of an implementation of a local network of interconnected devices 100 ("network") is shown. As seen in FIG. 1, the network 100 includes multiple device nodes of different types in signal communication with each other. In particular, the network 100, in this example, includes a bridge computing device or gateway device node 102 ("gateway"), access devices 104a, 104b, 104c, 104d, and 104e (generally access device 104 and collectively access devices 104a-e), and device nodes 106a, 106b, 106c, 106d, 106e, 106f, 106g, and 106h (generally device node 106 and collectively device nodes 106a-h). It will be appreciated that the network 100 depicted in FIG. 1 is illustrated by way of example only and that other implementations of a local network of interconnected devices may include more or fewer devices nodes in signal communication with each other.

As also seen in FIG. 1, the gateway 102 and the access device 104e are each in signal communication, via a network 108, with a device management server 110. The network 108 may be a WAN that includes one or more wired and/or wireless networks such as, e.g., the Internet, a cellular network, a satellite network, and the like. In this way, the access device 104e may communicate with the gateway 102 or any of the other device nodes 106 of the network 100 even though that access device is located remotely relative to the other device nodes.

The device management server 110, in this example, includes an access portal 112 and a data store 114 storing user profiles 116 and device profiles 118. The access portal 112 is configured to facilitate the communications between the access device 104e and the gateway 102. Accordingly, in some example implementations, the access portal 112 may be implemented as a web server that utilizes the HyperText Transport Protocol (HTTP) to communicate with the access device 104e and the gateway 102. In particular, the access portal 112 may receive HTTP requests from the access device 104e and gateway 102 and transmit HTTP responses to the access device 104e and gateway 102. In addition, the access portal 112 may be configured to push communications to the access device 104e and the gateway 102. In some example implementations, the access portal 112 may utilize HyperText Transport Protocol Secure (HTTPS) to encrypt and thus secure the communications. The content (i.e., the payload) of the communications may be formatted according to an Extensible Markup Language (XML) format and/or a JavaScript Object Notation (JSON) format. Content may thus be submitted to the access portal 112, for example, in HTTP POST requests. The content of the communications may also be encrypted using a key associated with the device node receiving the communications. Encrypting communications between device nodes of a local network of interconnected devices is discussed in further detail below. The access portal 112 of the device management server 110 may thus act as a relay for communications between the gateway 102 and device nodes 106 and the remotely-located access device 104e. Various configurations and arrangements may be employed to implement the device management server 110. In some example implementations, the access portal 112 and data store 114 may reside at the same machine while in other example implementations an access portal and data store may reside at different machines that are in signal communication with each other.

The user profiles 116 stored at the data store 114 include individual user profiles for users each having established respective local networks of interconnected devices. Individual user profiles 116, in this example, include data corresponding to a unique identifier for the user (e.g., a user account number, a username, an email address, a phone number, and the like). Individual user profiles 116 may also include data corresponding to login credentials (e.g., a username and a salted and hashed password). The device profiles 118, in this example, include two types of device profiles: i) device profiles corresponding to the gateway 102 and device nodes 106 of the network 100, and ii) device profiles corresponding to the access devices 104 that communicate with the device nodes 106. Individual device profiles 118 for device nodes include data corresponding to a unique identifier for the device node (e.g., a serial number), a device type, a default or user-specified description of the device, a security token associated with the device, one or more keys associated with the device (e.g., public and private digital signature keys), and a status of the device. In some example implementations, device nodes may be associated with multiple serial numbers, e.g., a 16 byte serial number and a 4 byte serial number. The serial numbers, security token, and keys may be generated at the time of manufacture and associated with the device throughout its lifetime. The keys may be, e.g., 128-bit keys. A device node may utilize one or more of its keys with one or more encryption algorithms to encrypt at least a portion of the communications transmitted and with one or more decryption algorithms to decrypt at least a portion of the communications received.

Individual device profiles 118 for device nodes also include data identifying the user profile 116 the device node is associated with (e.g., the user account number, username, email address, and the like). Individual device profiles for the access devices 104 may likewise include data corresponding to a unique identifier for the access device (e.g., a serial number, a device address such as a media access control (MAC) address, and the like), a type of the access device (e.g., mobile cellular telephone, tablet computing device, keyfob, and the like), a manufacturer of the access device, a model number of the access device, an operating system of the access device, and the like. The device profiles for gateways may also include a command queue corresponding to a list of commands that have been transmitted to the device management server from access devices located remotely relative to the local network of interconnected devices. As described in further detail below, the device management server transmits to a gateway the commands included in its corresponding command queue. Individual user profiles 116 may also include or be otherwise associated with invitations to other access devices authorized to communicate with, and thus access, the device nodes 106 of the network 100. Invitations will be discussed in further detail below. In addition, the data included in the user profiles 116 and device profiles 118 discussed above is described by way of example only. Accordingly other implementations of the user and device profiles may include additional or alternative data corresponding to additional or alternative aspects or characteristics of the users, device nodes, and access devices.

The data store 114 may include a database (not shown) that implements a data model for storing the data of the user profiles 116 and the device profiles 118. The database may store the data of the user profiles 116 and the device profiles 118 according to that data model. The database may thus include one or more tables respectively corresponding to users and device nodes, e.g., a USER table, a DEVICE table, and an INVITATION table. The rows of the USER table may correspond to records of the user profiles 116, and the rows of the DEVICE table may correspond to records of the device profiles 118. The rows of the INVITATION table may correspond to records of invitations that have been generated for access devices. The columns of the tables may correspond to the particular data elements stored for the user profiles 116 and the device profiles 118. The database may associate records of individual user profiles 116 with records of device profiles 118 through the use of primary and/or foreign keys included in those records. The database may associate records of individual user profiles 116 with invitations in a similar fashion. Through the associations of their corresponding database records, users and user accounts are thus associated with access devices 104 and devices nodes 106 of the network 100. The device management server 110 may thus also include a database management system (DBMS, not shown) that manages the storage and retrieval of the data of the user profiles 116 and the device profiles 118, e.g., creating new records, querying for existing records, and deleting records from the database. The access portal 112 and the gateway 102, in this example, are in signal communication with the data store 114 and may store and retrieve the data of the user profiles 116 and the device profiles 118, e.g., via the DBMS.

The access portal 112, in this example, is also configured to authenticate the access device 104e based on login credentials provided by to the access device by the user and subsequently transmitted to the access portal. Upon successful authentication, the access portal 112 may provide a dashboard interface ("dashboard") at which the user may access and manage the devices of the network 100 that are associated with the user account of the user. The access device 104e may present the dashboard to the user and accept input from the user. Through the dashboard, the user may, for example, check the status of device nodes 106 in the network 100, issue commands to device nodes, toggle activation of the device nodes, add device nodes to the network, remove device nodes from the network, view audit logs associated with the device nodes, view access devices currently authorized to communicate with the device nodes, view invitations to other access devices, resend invitations to access devices, create new invitations, and engage in other activities associated with the device nodes that will be appreciated with the benefit of this disclosure. These activities will be discussed further below.

The access devices 104, in this example, are configured with instructions for receiving input from a user and providing output to a user and for communicating with the device management server 110, gateway 102, and device nodes 106. The instructions may be implemented for example, as a device monitoring and control mobile application ("mobile application") installed at an access device such as the mobile application 128 installed at the access device 104e. As discussed in further detail below, the mobile application 128 provides functionality for viewing the status of the device nodes, pairing and/or bonding with those device nodes, and issuing commands to those device nodes.

As noted above, some device nodes in a local network of interconnected devices may be in direct signal communication with each other while other devices nodes may be in indirect signal communication via a relay device node. Whether a device node is in direct or indirect signal communication with another device node depends on the wireless ranges of those device nodes. The network 100 shown by way of example in FIG. 1 illustrates device nodes that are both in direct and indirect signal communication with each other based on their wireless range. The dashed lines surrounding the gateway 102 and device nodes 106 in FIG. 1 demarcate the device nodes that are within their respective wireless range and thus in direct signal communication with each other. In particular, area 120 indicates that the gateway 102 and device nodes 106a-e are within wireless range; area 122 indicates that device nodes 106a-b are within wireless range; area 124 indicates that device nodes 106d and 106f are within wireless range; and area 126 indicates that device nodes 106e and 106g-h are within wireless range. FIG. 1 also illustrates respective access devices 104a-d that are within the wireless range of various device nodes 106 of the network. In particular, access device 104a is in direct signal communication with the gateway 102 and device node 106g, access device 104b is in direct signal communication with device nodes 106a-b, access device 104c is in direct signal communication with device node 106c, and access device 104d is in direct signal communication with device nodes 106d-e. As discussed in further detail below, the communications among the access devices 104, gateway 102, and devices nodes 106 may be secured using various security techniques.

The device nodes 106 may include different classes of device nodes, e.g., dual-mode device nodes and multi-mode device nodes. The device nodes 106 may also include different types of devices nodes within those classes of device nodes. Dual-mode and multi-mode device nodes may include the following types of device nodes: i) sensor-type device nodes that include sensors for measuring various parameters associated with the surrounding environment such as for example, acoustic and optical sensors, chemical sensors (e.g., oxygen, carbon dioxide, carbon monoxide, smoke, etc.), electric and magnetic sensors, electromagnetic radiation sensors, temperature sensors, force and pressure sensors, moisture and fluid flow sensors, air and air flow sensors, velocity and acceleration sensors, position and displacement sensors, proximity and motion sensors, and the like; and ii) activation-type device nodes that include actuators, solenoids, and/or output devices that are operable in response to receipt of commands such as, for example, locks for structures (e.g., doors, gates, and the like) and for containers (e.g., safes, drawers, cabinets, and the like), optical output devices (e.g., lights, display devices, and the like), audio output devices (e.g., speakers, alarms, and the like), automatic garage door openers, automatic gate openers, and the like. In some example implementations, device nodes may be configured to include audio data and/or image data in the communications transmitted to other device nodes, a gateway, the device management server, or an access device.

Figure 2:
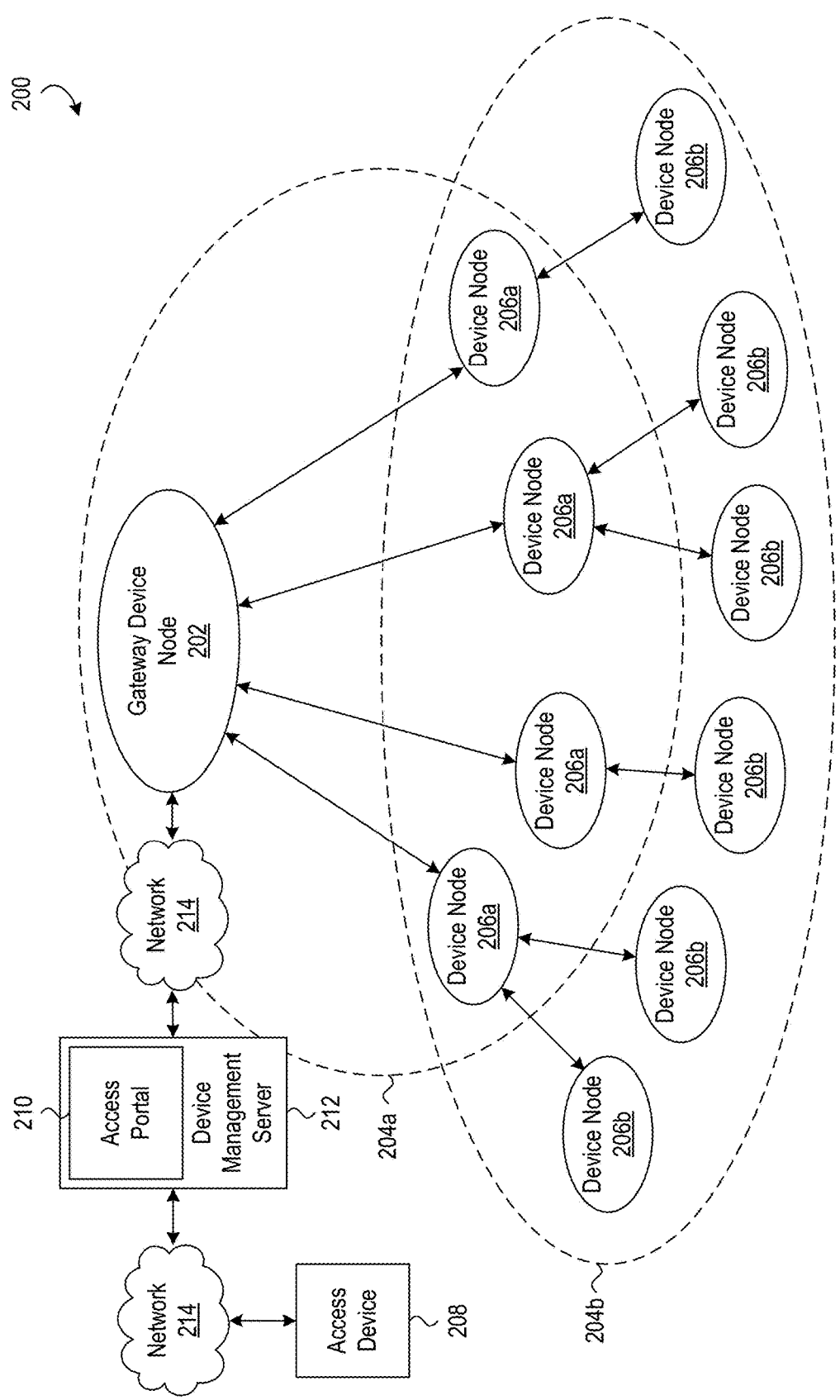
FIG. 2 depicts another example of an implementation of a local network of interconnected devices in accordance with aspects described herein.

Referring now to FIG. 2, another local network of interconnected devices 200 ("network") is shown. In FIG. 2, the hierarchical arrangement of the network 200 is depicted with respect to a bridge device or gateway device node 202, a set 204a of zero-level device nodes 206a, and a set 204b of first-level device nodes 206b (collectively device nodes 206). In FIG. 2, the zero-level device nodes 206a and the gateway 202 are within their respective wireless ranges and thus in direct signal communication with each other. The first-level device nodes 206b are outside the wireless range of the gateway 202, but within the wireless range of one of the zero-level device nodes 206a. The first-level device nodes 206b are thus in direct signal communication with the zero-level device nodes 206a and in indirect signal communication with the gateway 202 via the zero-level device nodes. Second-level device nodes (not shown) may be in direct signal communication with the first-level device nodes 206b and in indirect signal communication with the gateway 202 via the first-level device nodes and the zero-level device nodes 206a in a similar fashion. Third-level device nodes, fourth-level device nodes, and so on, may be connected to upper-level device nodes in a similar fashion. Accordingly the number of levels of the local network of interconnected devices is not intended to be limited to the two example levels shown in FIG. 2. As also seen in FIG. 2 and noted above, the gateway 202 (and thus the device nodes 206) may be in signal communication with an access device 208 via an access portal 210 of a device management server 212 across a network 214, e.g., a WAN such as the Internet and/or a cellular network.

In this hierarchical arrangement, the gateway 202 and device nodes 206 may interact in a master-slave configuration. In other words, one device may be designated as a master device node, and another device may be configured as a slave device node relative to that master device node. The master device node may issue commands to the slave device node, and the slave device node may respond according to those commands. With respect to the network 200 shown by way of example in FIG. 2, the gateway 202 may be configured as a master device node, and at least one of the zero-level device nodes 206a may be configured as a slave device node to the gateway. Additionally or alternatively, one of the zero-level device nodes 206a may be configured as a master device node, and one of the first-level device nodes 206b may be configured as a slave device node relative to that zero-level device node. Commands transmitted from a master device node to a slave device node include a command to provide the current status of the slave device node (e.g., whether a lock-type device node is in a locked or unlocked state), a command to provide a measurement value measured by the slave device node (e.g., the current reading measured by a sensor-type device node), and a command to perform some action at the slave device node (e.g., perform a lock or unlock operation at a lock-type device node). Other examples of various command types and specific commands will be appreciated with the benefit of this disclosure.

By equipping the device nodes with multiple types of communication interfaces and configuring the device nodes to utilize multiple wireless communication standards, users advantageously derive the benefit of multiple types of network topologies. As an example, various short-range wireless communication standards may be suitable for establishing master/slave configurations in point-to-point networks, star networks, and tree networks but might not be suitable for establishing mesh networks. Various low-power wireless communication standards, however, may be suitable for establishing mesh networks. Accordingly, device nodes configured to utilize both short-range and low-power wireless communication standards may thus establish networks that include a combination of network topologies, e.g., networks exhibiting point-to-point, star, tree, and mesh topologies. The device nodes may advantageously utilize each of the respective features provided by the different technologies, e.g., the master/slave features available with the point-to-point, star, and tree network topologies as well as the relay features and multiple communication pathways available with the mesh network topology.

One or more of the device nodes of the local network of interconnected devices may receive updates with respect to its stored instructions. A device node may receive an update wirelessly or via a wired connection. As an example, a gateway device node may receive an update from the device management server via its wired connection to a wide area network (e.g., the Internet). The device management server may also send an update for one of the device nodes to the gateway device node, and the gateway device node may wirelessly transmit the update to the specified device node (i.e., an over-the-air update). If necessary, the update for the specified device node may be routed from the gateway device node via one or more other device nodes. A device node may also receive an update from an access device in signal communication with the device node. In some circumstances, the device management server may provide the gateway device node with an update to be applied at each device node of the local network of interconnected devices, and the gateway device node may broadcast the update to each of the device nodes.

Device Nodes

Figure 5:
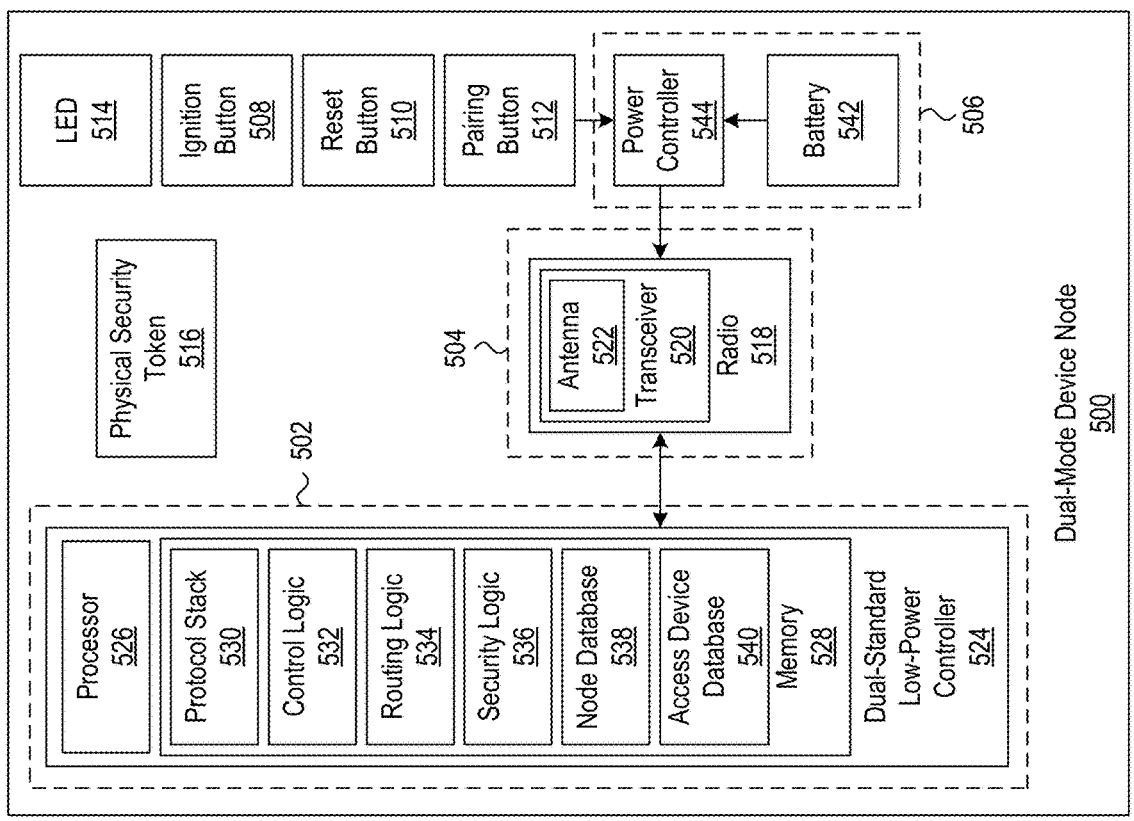
FIG. 5 depicts an example of an implementation of a dual-mode device node in accordance with aspects described herein.
Figure 4:
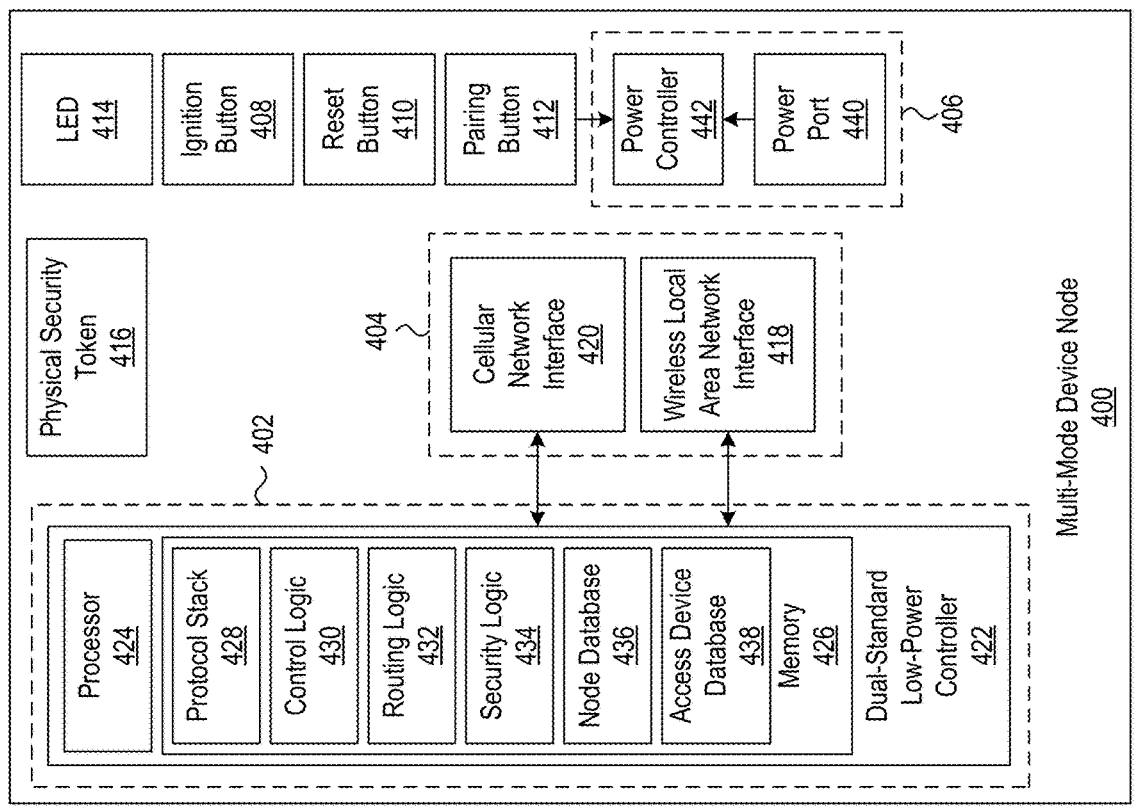
FIG. 4 depicts an example of an implementation of a multi-mode device node in accordance with aspects described herein.

Referring now to FIGS. 3-5 example types of device nodes are illustrated. In FIG. 3, an example of an implementation of a gateway device node is shown. In FIG. 4, an example of an implementation of a multi-mode device node is shown. In FIG. 5, an example of an implementation of a dual-mode device node is shown. The device nodes discussed above with reference to FIGS. 1-2 may respectively correspond to the example device nodes illustrated in FIGS. 3-5 and discussed in further detail below. A local network of interconnected devices may include one or more of each type of device node. In one example implementation of a local network of interconnected devices, a gateway node may serve as the hub of multiple dual-mode device nodes and multi-mode device nodes that are part of the network at various layers. FIGS. 3-5 include lines illustrating the signal paths between various components of the device nodes. It should be appreciated, however, that, for the sake of clarity, not every signal path between the components of the device nodes have been illustrated in the figures.

Device nodes—including gateway device nodes, dual-mode device nodes, and multi-mode device nodes—may each be assigned a serial number, a security token, and a set of keys (e.g., three keys) upon manufacture. This unique identification information is employed to recognize, authenticate, and authorize device nodes when added to a local network of interconnected devices and when communicating with other device nodes of the network and the device management server. The keys are also used to encrypt and decrypt portions of the communications exchanged between access devices and other device nodes. In particular, the device nodes may utilize the keys to encrypt and decrypt session identifiers of the communication sessions established between access devices and other device nodes as well as the content of those communications. Authorized access devices may also be provided with the keys associated with a device node and also utilize those keys to encrypt and decrypt portions of the communications exchanged with the device node.

With reference to FIG. 3, an example of an implementation of a gateway device node 300 ("gateway") is shown. The gateway 300, in this example, includes a control module 302, a communication module 304, a power module 306. The gateway 300, in this example, also includes multiple physical user interface elements including an ignition button 308, a reset button 310, a pairing button 312, and a light emitting diode (LED) 314. In other examples, a gateway device node may omit buttons 308-312 and may instead include only a single factory reset button used to restore the factory settings of the gateway device node. In some examples, a gateway device node may omit physical buttons entirely.

The communication module 304 of the gateway 300 includes multiple communication interfaces. In particular, the communication module 304, in this example, includes a wired LAN interface 316, a wireless LAN interface 318, and a cellular network interface 320. The gateway 300 may thus exchange wired and wireless communications with access devices and device nodes of the local network of interconnected devices via one or more of the wired LAN interface 316, the wireless LAN interface 318, and the cellular network interface 320. Although not shown in FIG. 3 for the sake of clarity, the communication module 304 of the gateway 300 may also include one or more radios with corresponding transmitters, receivers, and/or transceivers having one or more antennas to receive and/or transmit wireless communications. Such radios may include radios configured to operate at one or more frequencies suitable for wireless LAN communications such as those frequencies in the ISM band (e.g., 2.4 GHz radios, 5 GHz radios, 60 GHz radios) as well as radios configured to operate at one or more frequencies suitable for cellular communications such as the frequency bands specified by various cellular network standards (e.g., the 1G, 2G, 3G, and 4G families of cellular network standards). In addition, the communication module 304 of the gateway 300 may also include a physical communication port (e.g., an Ethernet port) configured to communicate via the wired LAN interface 316 (e.g., using one or more of the IEEE 802.3 family of Ethernet standards). The wireless LAN interface 318 may likewise be configured to communicate using one or more of the IEEE 802.11 family of wireless LAN standards. The wired LAN interface 316 and the wireless LAN interface 318 thus facilitate communications at the gateway 300 via IP-based networks including LANs and/or WANs (e.g., the Internet). The cellular interface 320 likewise facilitates the communications to and from the gateway 300 via a cellular network. The cellular network interface 320 may thus include a cellular modem. Cellular modems suitable for use with the cellular network interface 320 include those available from Gemalto M2M GmbH of Munich, Germany such as the cellular machine-to-machine modules having model numbers PLS8, PXS8, PCS3, PVS8, PHS8, PGS8, PDS5, PDS6, PDS8, and the like. The various communication interfaces of the communication module 304 of the gateway 300 advantageously allow access devices that are located remotely relative to the local network of interconnected devices to communicate with the device nodes of the network for monitoring and control purposes.

The control module 302 of the gateway 300 includes multiple controllers for handling and responding to the communications received at and transmitted from the gateway 300. In particular, the control module 302 of the gateway 300, in this example, includes a dual-standard low-power controller 322 ("low-power controller"), a dual-standard short-range controller 324 ("short-range controller"), and a local area network controller 326 ("LAN controller"). As seen in FIG. 3, the LAN controller 336, in this example, is in signal communication with the wired LAN interface 316, the low-power controller 322, and the short-range controller 324. The low-power controller 322, in this example, is also in signal communication with the wireless LAN interface 318 and the cellular network interface 320. The low-power controller 322, wireless LAN interface 318, and cellular network interface 320 may be in respective signal communication with one or more radios (not shown) of the communication module 304.

The short-range controller 324, in this example, is configured to selectively utilize multiple short-range wireless communication standards to wirelessly communicate with access devices and device nodes of the local network of interconnected devices. In some example implementations, the short range controller 324 may be configured to wirelessly communicate using both the Bluetooth Classic and the BLE short-range wireless communication standards. In this way, the gateway 300 may wirelessly communicate with access devices and device nodes that are also configured to wirelessly communicate using the Bluetooth Classic and/or BLE short-range wireless communication standards. In this regard, the short-range controller 324 includes memory 326 storing instructions corresponding to a protocol stack 328 that is configured to handle and process multiple types of short-range wireless communications received at the gateway 300 (e.g., Bluetooth Classic communications and BLE communications) from the access devices or device nodes of the local network of interconnected devices. The protocol stack 328 may be any protocol stack suitable for use with a local network of interconnected devices including, for example, those protocol stacks designed for embedded systems (e.g., the Qualcomm® Bluetopia™ protocol stack available from Qualcomm Atheros, Inc. of San Jose, Calif.).

The low-power controller 322, in this example, is configured to selectively utilize multiple low-power wireless communication standards to wirelessly communicate with access devices and device nodes of the local network of interconnected devices. In some example implementations, the low-power controller 322 may be configured to utilize both the BLE and the ANT low-power wireless communication standards. In this way, the gateway 300 may wirelessly communicate with access devices and device nodes that are also configured to wirelessly communicate using the BLE and/or ANT low-power wireless communication standards. In this regard, the low-power controller 322 likewise includes memory 330 storing instructions corresponding to a protocol stack 332 that is configured to handle and process multiple types of low-power wireless communications received at the gateway 300 (e.g., BLE communications and ANT communications) from the access devices or device nodes of the local network of interconnected devices.

As seen in FIG. 3, the low-power controller 322 is in signal communication with the wired LAN interface 316 (via the LAN controller 326), the wireless LAN interface 318, and the cellular network interface 320. In this way, the gateway 300 may advantageously route communications received via any of these interfaces to device nodes of the local network of interconnected devices, the access devices, and the device management server. The cellular network interface 320 may employ an AT command structure and/or a machine-to-machine command structure for communicating with the low-power controller 322. The wired LAN interface 316 and the wireless LAN interface 318 may likewise employ a serial command structure for communicating with the low-power controller 322. As an example, the wired LAN interface 316 may communicate with the low-power controller 322 via the LAN controller 326 using universal asynchronous receiver/transmitter (UART) communications.

The low-power controller 322 may be a system-on-chip (SoC). Accordingly the low-power controller 322 may include, among other components, a processor 334 and logic stored at the memory 330 for controlling operation of the low-power controller. The low-power controller 322 may thus include other components common to a SoC (e.g., timing sources, peripherals, digital signal interfaces, analog signal interfaces, power management components, and the like) which have been omitted from FIG. 3 for the sake of clarity. Low-power controllers suitable for use as the low-power controller 322 include those available from Nordic Semiconductor of Oslo, Norway such as the Multiprotocol ANT™/Bluetooth® low energy System on Chip having model number nRF51422 as well as those in the nRF52 Series SoC. In addition, a suitable protocol stack for use as the protocol stack 332 may also be available from Nordic Semiconductor of Oslo, Norway such as the Concurrent ANT™ and Bluetooth® Low Energy SoftDevice having model number S310 nRF51422 as well as those in the SoftDevice family of Nordic Semiconductor. Additional and alternative low-power controllers and protocol stacks may be selectively employed.

The low-power controller 322, in this example, is also configured with instructions for communicating with access devices and device nodes in the local network of interconnected devices. As seen in FIG. 3, the memory 330 of the low-power controller 322 stores instructions corresponding to control logic 336, routing logic 338, and security logic 340 for controlling operational aspects of the gateway 300. As also seen in FIG. 3, the memory 330 of the low-power controller 322 additionally includes a node database 342 for storing records corresponding to the device nodes of the local network of interconnected devices and an access device database 344 for storing records corresponding to the access devices that are authorized to communicate with those device nodes. The records of the node database 342 thus corresponds to a list of the device nodes of the local network of interconnected devices, and the records of the access device database 344 thus corresponds to a list of access devices that are authorized to access the device nodes of the network.

The control logic 336 of the low-power controller 322 corresponds to instructions that handle various operational aspects of the gateway 300. In particular, the control logic 336, in this example, handles the initialization of the gateway 300 upon startup including the configuration of various operating parameters such as, e.g., the operating frequency for the gateway, the initial security mode for the gateway, and the like. The control logic 336 also initiates the periodic transmissions (e.g., every 500 milliseconds) from the gateway 300 announcing its presence to any devices that are within wireless range of the gateway. In addition, the control logic 336 maintains the list of device nodes of the network by creating new records at the node database 342 when new device nodes are added to the network and deleting records from the node database when device nodes are removed from the network. The control logic 336 additionally handles the pairing and bonding procedures performed with access devices. For example, the control logic 336 may implement one or more of the procedures used to establish a communication session as described in commonly-owned U.S. Pat. No. 9,407,624. Furthermore the control logic 336 issues commands to the device nodes of the network (e.g., operations to perform) and polls the device nodes for status updates. Moreover the control logic 336, in this example, also sets a security mode of the gateway 300 in response to receipt of user input indicating a user-selected security mode. The control logic 336 additionally issues, to device nodes of the network, commands that instruct those device nodes to employ a user-selected security mode. Additional operational aspects associated with the gateway that the control logic 336 may handle will be appreciated with the benefit of this disclosure.

The routing logic 338 of the low-power controller 322 corresponds to instructions that route communications between device nodes of the local network of interconnected devices, between the device management server and those device nodes, and between the access devices and those device nodes. The routing logic 338 thus ports communications received at the gateway 300 via the low-power wireless communication standards to the other communication standards the gateway 300 is configured to use, e.g., the wired LAN and wireless LAN communication standards, the short-range communication standards, and the cellular communication standards. The routing logic 338 likewise ports communications received via these other communication standards to the low-power communication standards utilized by the low-power controller 322. The routing logic 338 may include routing tables that are utilized to route communications through the local network of interconnected devices. Those routing tables may be updated responsive to changes at the local network of interconnected devices, e.g., as device nodes are added to and removed from the network. The gateway 300 may also be configured to measure various metrics associated with the transmission environment surrounding the gateway (e.g., signal-to-noise ratio, parity check losses, and the like) and make routing decisions based on those metrics, e.g., determining whether to route a communication to a device node using one or more of a low-power wireless communication standard, a short-range wireless communication standard, a wireless LAN communication standard, and/or a wired LAN communication standard. As an example, the metrics measured by the gateway 300 may favor routing a communication via one device node over another device node depending on the environmental metric measurements. The routing logic may also make routing decisions based on the respective security modes set for the device nodes along potential routing pathways. As an example, the routing logic may not select a potential routing pathway where the security mode for a device node along that pathway is relatively less secure than the security mode set for the target device node. In other words, when routing a communication to a target device node, the routing logic may select a routing pathway where the respective security modes of each device node along that pathway is at least as secure as the security mode set for the target device node.

The security logic 340 of the low-power controller 322 corresponds to the instructions that control the manner in which the gateway 300 secures the communications (if at all) between access devices, other device nodes of the network, and the device management server. The security logic 340, in this example, includes respective sets of instructions that each correspond to a particular security mode. Each respective security mode may be configured to employ various techniques for securing the communications or, in some circumstances, permitting unsecured communications. Accordingly, example security modes included in the security logic 340 may include one or more security modes that require communications to be encrypted as well as one or more security modes that permit communications to be unencrypted. In addition, the security modes requiring encryption may each specify a particular encryption method to employ when encrypting the communications, e.g., security modes respectively requiring relatively more or less complex encryption methods. The security logic 340 stored at the memory of the low-power controller 322 may include one or more keys associated with the gateway device node 300 used to encrypt the content (i.e., the payload) and communications transmitted to the access devices as well as decrypt the content and communications received from access devices, the device management server, and other device nodes of the network. The security modes that do not require encryption may include security modes that require authentication of a security token in order to communicate as well as security modes that permit communication without authenticating a security token. The gateway 300 may be configured with a default security mode. As noted above, however, the security mode of the gateway 300 may be changed in response to receipt of user input identifying a security mode selected for the gateway by the user. User-selectable security modes will be discussed in further detail below.

The node database 342, in this example, stores records of the device nodes of the local network of interconnected devices. A device node record includes a set of information associated with one of the device nodes of the network. A device node record may include, for example, the serial number of the device node and a security token associated with the device node. A device node record may also include the local network address assigned to the device node upon joining the network, the serial number of its parent device node, the local network address assigned to its parent device node, and the layer number of the parent device node in the network. A device node record may also include identifications of the class of device node as well as the type of the device node—e.g., whether the device node is dual-mode or multi-mode device node, whether the device node is a sensor-type device node or an activation-type device node, and the particular type of sensor or activatable device. In addition, a device node record may include an indication of the security mode set for the device node. Furthermore a device node record may include an indication of whether the device node is powered via an internal power source (e.g., a battery) or via an external power source (e.g., an AC or DC power supply). In some example implementations, the device class, device type, and power profile may be encoded in the serial number of the device node. A device node record may also include one or more of the keys associated with the device node and used by the low-power controller 322 to encrypt and decrypt content and communications transmitted to and received from the device node corresponding to that device node record.

The access device database 344, in this example, stores records of the access devices that are authorized to exchange communications with device nodes of the local network of interconnected devices. The low-power controller 322 may create a new record for an access device when the gateway 300 successfully bonds with that access device during a pairing and bonding procedure. The gateway device node 300 may bond with an access device by employing the procedures used to establish a communication session as described in commonly-owned U.S. Pat. No. 9,407,624. In this way, the low-power controller 322 may engage in subsequent low-power communication sessions with that access device without repeating the pairing and bonding process. An access device record includes a set of information associated with an access device including information used to secure communications between the gateway 300 and the access device. An access device record may include, for example, a unique identifier for the access device (e.g., a MAC address) and one or more keys exchanged between the gateway 300 and the access device during a bonding procedure (e.g., LTK, EDIV, and Rand keys). The keys exchanged may include, e.g., a key to secure communications exchanged between the gateway 300 and the access device during a communication session as well as a key associated with the access device that is used to verify digital signatures received from the access device and sign content transmitted to the access device. An access device record may also include an invitation code generated for an invited access device that has been authorized to communicate with the gateway 300. The short-range controller 324 may also include an access device database similar to the access device database 344 of the low-power controller 322. In this way, the short-range controller 324 may likewise store records of access devices that have bonded with the gateway 300 which the short-range controller may utilize for subsequent short-range communication sessions with the access device.

The LAN controller 326 handles and processes the communications received at and transmitted from the gateway 300 via the wired LAN interface 316. Such communications may be received from and transmitted to the device management server via an IP-based WAN such as the Internet. Accordingly, the LAN controller 326, in this example, likewise includes memory 346 storing instructions corresponding to a protocol stack 348 that is configured to handle and process IP-based communications received at the gateway 300 from the device management server. Protocol stacks suitable for use as the protocol stack 348 of the LAN controller 326 include those designed for use in embedded systems (e.g., the open source "lightweight IP" protocol stack, the open source "micro IP" protocol stack, and the like). As seen in FIG. 3, the LAN controller 326 is in signal communication with both the short-range controller 324 and the low-power controller 322. Accordingly the LAN controller 326, in this example, is configured to port communications between the wired LAN interface and the short-range controller 324, between the wired LAN interface and the low-power controller, and between the short-range controller and the low-power controller. In addition, some implementations of the gateway device node may store the device node database and access device database in local memory rather than the memory of a low-power controller. The low-power controller, in these example implementations, may thus be in signal communication with the local memory of the gateway device node to access the device node database and access node database.

In some example implementations, the short-range controller 324 and/or the LAN controller 326 may also be SoCs and thus include their own respective processors, timing devices, control logic, and the like. In other example implementations, the gateway 300 itself may include, e.g., one or more processors, timing devices, and memory storing instructions corresponding to control logic (also omitted from FIG. 3 for the sake of clarity) which the short-range controller 324 and/or the LAN controller 326 may utilize for operation.

The power module 306 of the gateway 300 includes components for supplying power to the gateway 300 and configuring how power is supplied to the gateway. The power module 306, in this example, includes both an internal power source, a battery 350, and a power port 352 for connecting to an external power source (e.g., an AC or DC power source). The battery 350 may be a battery (e.g., an alkaline battery, a lithium-ion battery, a nickel-cadmium battery, lead-acid battery, and the like) and may be recharged when an external power source supplies power to the gateway 300 via the power port 352. The power module 306 also includes a power switch 354 for controlling whether the gateway 300 is powered by the battery 350 or an external power source via the power port 354. A user may thus toggle the switch to selectively control whether the internal or external power source provides power to the gateway 300. In some examples, a gateway device may not include a battery and may instead be only mains powered. Additionally or alternatively, the gateway 300 may be receive power via Power over Ethernet (PoE), an energy harvesting device that harvests ambient energy (e.g., energy from sources such as solar, thermal, wind, fluid flow, kinetic movements, mechanical strain, electromagnetic radiation, and the like), or a wireless power transfer (WPT) using electric, magnetic, or electromagnetic fields.

The power module 306, in this example, also includes a power controller 356 connected to the battery 350 and the power port 352. The power controller 356 may, in turn, be connected to one or more of the radios (not shown) of the gateway 300 to control the power supplied to the radios and thus control the transmission power of the wireless communications transmitted from the gateway. The power controller 356 may thus control the wireless range of the gateway 300 by controlling the transmission power of its radios. Furthermore the power controller 356 may automatically adjust the power supplied to a radio based on whether the gateway 300 is currently powered by an internal power source (e.g., the battery 350) or an external power source. If currently powered externally, the power controller 356 may provide full power to a radio of the gateway in order to maximize the wireless range of the gateway (e.g., up to about 100 m). In some example implementations, full power to a radio of the gateway 300 may result in transmission power between about 18 decibels (dB) and about 23 dB. If currently powered internally, however, the power controller 356 may provide less than full power to a radio of the gateway in order to reduce or minimize power consumption at the gateway at the expense of a wireless range that is less than the maximized wireless range.

As seen in FIG. 3, the gateway 300, in this example, also includes a paring button 312 connected to the power controller 356. A user may press the pairing button 312 to temporarily reduce the transmission power of the gateway 300 such that its wireless range is minimized (e.g., up to about 1 m). As described in further detail below, the user may press the pairing button to reduce the wireless range of the gateway 300 as a security measure when pairing and bonding an access device with the gateway. In this way, the user may ensure that no other devices can receive the communications exchanged between the gateway and the access device during the pairing and bonding process. In some example implementations, the pairing button 312 may be configured such that the transmission power of the gateway 300 is reduced until the pairing button is again pressed by the user. In other example implementations, the pairing button 312 may be configured to initiate a temporary reduction of the transmission power of the gateway for a predetermined time period (e.g., about 1-2 minutes) such that, at the end of that time period, the transmission power of the gateway returns to the previous transmission power.

The ignition button 308 of the gateway 300, in this example, triggers an initialization procedure at the gateway 300. In some example implementations, the control logic 336 of the low-power controller 322 is configured to carry out the initialization procedure. The initialization procedure may include, for example, setting various operating parameters (e.g., selecting an operating frequency channel), confirming signal communication with the device management server via the wired LAN interface 316, confirming signal communication with a cellular network via the cellular network interface 320, clearing any existing records from the node database 342 and the access device database 344, and transmitting announcements indicating the gateway is present and available to accept requests to join the local network of interconnected devices. Forming the local network of interconnected devices is discussed in further detail below. The reset button 310 of the gateway 300, in this example, triggers re-initialization of the gateway 300. The LED 314 of the gateway 300, in this example, may indicate one or more statuses of the gateway 300, e.g., via the on/off status of the LED or via its blink pattern. One or more respective blink patterns of the LED may indicate, for example, that an error has occurred during the initialization procedure (e.g., the gateway could not connect to the device management server or the cellular network), that an access device has successfully paired and bonded with the gateway, that a device node has been added to or removed from the local network of interconnected devices, and the like. If the ignition button 308 is omitted from a gateway device node, then that gateway device node may perform the initialization procedure described above automatically upon power-up.

Finally, the gateway 300, in this example, includes a physical security token 358 that is affixed to the gateway 300 and accessible to a user. As an example, the physical security token 358 may be affixed to a housing of the gateway 300. The physical security token 358 may be a barcode (e.g., a QR code) that encodes information associated with the gateway 300. The encoded information may include, e.g., the serial numbers of the gateway 300, the device class and device type, the default security level for the gateway, and the security token associated with the gateway. This information may also be encrypted, and the barcode may encode the encrypted information. The information may be encrypted using an encryption algorithm suitable for embedded systems such as, e.g., the tiny-AES128-C encryption algorithm. An access device may scan the barcode (e.g., using an optical input device such as a camera) to obtain the encoded information. The access device may also store a key (e.g., as part of the mobile application), and use the key to decrypt the encrypted information obtained from the barcode.

Referring now to FIG. 4, an example of an implementation of a multi-mode device node 400 is shown. Similar to the gateway device node 300, the multi-mode device node 400, in this example, includes a control module 402, a communication module 404, and a power module 406. The multi-mode device node 400, in this example, also includes an ignition button 408, a reset button 410, a pairing button 412, and an LED 414. The multi-mode device node 400 may also include a physical security token 416 affixed to the device node, e.g., to a housing of the device node. In other examples, a multi-mode device node may omit buttons 408-412 and may instead include only a single factory reset button used to restore the factory settings of the multi-mode device node. In some examples, a multi-mode device node may omit physical buttons entirely.

The ignition button 408, the reset button 410, and the pairing button 412 may be the same as or at least similar to the ignition button 308, the reset button 310, and the pairing button 321 respectively discussed above with reference to FIG. 3. In some example implementations, the multi-mode device node 400 may be configured to enter into a sleep mode if it is unable to connect to a local network of interconnected devices after a user presses the ignition button 408. Engaging the reset button 410 may cause the multi-mode device node to awake from the sleep mode and reattempt the process of locating a network to connect to. The physical security token 416 may also be the same as or at least similar to the physical security token 358 discussed above with reference to FIG. 3 and encode the same type of information associated with the multi-mode device node 400. If the ignition button 408 is omitted from a multi-mode device node, then that multi-mode device node may perform an initialization procedure automatically upon power-up.

The communication module 404 of the multi-mode device node 400, in this example, likewise includes multiple communication interfaces. In particular, the communication module 404, in this example, includes a wireless LAN interface 418 and a cellular network interface 420. The multi-mode device node 400 may thus exchange wireless communications with a access devices, a gateway device node, and other device nodes of the local network of interconnected devices via one or more of the wireless LAN interface 418 and the cellular network interface 420. The wireless LAN interface 418 may be the same as or at least similar to the wireless LAN interface 318 discussed above with reference to FIG. 3, and the cellular network interface 420 may be the same as or at least similar to the cellular network interface 320 also discussed above with reference to FIG. 3. In addition, although again not shown in FIG. 4 for the sake of clarity, the communication module 404 of the multi-mode device node 400 may also likewise include one or more radios with corresponding transmitters, receivers, and/or transceivers having one or more antennas to receive and/or transmit those wireless communications. The radios of the multi-mode device node 400 may likewise be the same as or at least similar to the radios of the gateway device node 300 discussed above with reference to FIG. 3.

The control module 402 of the multi-mode device node 400, in this example, includes a single controller 422 for handling and responding to the wireless communications received at and transmitted from the multi-mode device node. The controller 422, in this example, is also a dual-standard low-power controller ("low-power controller") configured to selectively utilize multiple low-power wireless communication standards to wirelessly communicate with access devices, a gateway device node, the device management server, and other device nodes of the local network of interconnected devices. In some example implementations, the low-power controller 422 may be configured to utilize both the BLE and ANT low-power wireless communication standards. As seen in FIG. 4, the low-power controller 422 is in signal communication with both the wireless LAN interface 418 and the cellular network interface 420. The low-power controller 422 may also be in signal communication with one or more of the radios of the multi-mode device node 400. In this way, the multi-mode device node 400 may likewise route communications received via any of these interfaces to access devices, the gateway device node, the device management server, and other device nodes of the network.

The low-power controller 422 may be the same as or at least similar to the low-power controller 322 discussed above with reference to FIG. 3, e.g., an SoC. In this regard, the low-power controller 422 likewise includes a processor 424 and memory 426 storing instructions that are executed by the processor for controlling operational aspects associated with the multi-mode device node 400. The instructions stored at the memory 426 of the low-power controller 422, in this example, include instructions corresponding to a protocol stack 428 that is configured to handle and process multiple types of low-power wireless communications received at and transmitted from the multi-mode device node 400 (e.g., BLE communications and ANT communications) from access devices, a gateway device node, the device management server, or other device nodes of the local network of interconnected devices. The protocol stack 428 of the low-power controller 422 may thus be the same as or at least similar to the protocol stack 332 of the low-power controller 322 discussed above with reference to FIG. 3.

In some example implementations, a device node may also include a signal processor situated between the low-power controller and the radio. The signal processor may intercept the output sent from the low-power controller to the radio and likewise intercept input received at the radio to be sent to the low-power controller. Processing the input and output may include filtering and/or amplifying the signals. As an example, it may be desirable to amplify the signals output from the low-power controller to increase the wireless transmission range of the device node. The extent to which those signals may be amplified might be limited, however, due to distortion that occurs when the signals are amplified beyond a certain power level, e.g., −5 dBm. In order to further amplify the signals and avoid distortion, the signal processor may intercept the signals output by the low-power controller and filter and amplify those signals before passing the signals to the radio for transmission. Suitable signal processors include the 2.4 GHz ZigBee®/802.15.4 Front-End Module having model number SE2431L available from Skyworks Solutions, Inc. of Woburn, Mass.

The memory 426 of the low-power controller 422, in this example, also stores instructions corresponding to control logic 430, routing logic 432, and security logic 434 also for controlling operational aspects of the multi-mode device node 400. The routing logic 432 and the security logic 434 may be the same as or at least similar to the routing logic 338 and security logic 340 discussed above with reference to the gateway 300 in FIG. 3. The routing logic 432 may thus also route communications to an access device, a gateway device node, a device management server, or other device nodes of the local network of interconnected devices.

Depending on the device node type of a multi-mode device node, however, the security logic 434 may include instructions corresponding to a subset of the security modes available at a gateway device node. As an example, the security logic of multi-mode device nodes that are configured to secure buildings, structures, and containers (e.g., lock-type device nodes), may include instructions corresponding to security modes that are relatively more secure than other security modes. The security logic of multi-mode device nodes that are not at risk for unauthorized access may include instructions corresponding to both relatively less secure and relatively more secure security modes. Where the multi-mode device node is a sensor-type device node, for example, the risk or costs of unauthorized access may be relatively small. Accordingly, the security logic of one or more sensor-type multi-mode device nodes may include instructions corresponding to one or more relatively less secure security modes. In addition, as noted above, the security logic 434 of the multi-mode device node 400 may be configured to employ a default security mode or a user-selected security mode.

The control logic 430 of the low-power controller 422 may depend on the device node type of the multi-mode device node 400. For activation-type multi-mode device nodes, the control logic 430 may include instructions for receiving and processing commands from a gateway device node, the device management server, or other device nodes of the local network of interconnected devices. For activation-type multi-mode device nodes, commands may include commands to activate a motor, an actuator, solenoid, optical output device or unit, audio output device or unit, and the like. For lock-type multi-mode device nodes, in particular, commands may include commands to toggle a lock status, i.e., commands to lock or unlock. For sensor-type multi-mode device nodes, commands may include commands to, e.g., activate or deactivate one or more sensors, adjust one or more sensor parameters (e.g., sensitivity), take a new measurement, and provide a most recent measurement, the previous x number of measurements, or a measurement obtained at a specified date and/or time or within a specified date range or time period.

The control logic 430 of the low-power controller 422 may also include instructions that are not dependent on the device node type. In particular, the control logic 430 for each type of multi-mode device node may include instructions for initializing the multi-mode device node upon startup, searching for and connecting to a local network of interconnected devices to join (e.g., a gateway device node or another device node), responding to polling commands (e.g., transmitted by a gateway device node), adding a new device node to the network, registering that new device node with a gateway device node, removing a device node from the network, establishing a master/slave relationship with another device node, and exchanging communications with an access device. The control logic 430 of the low-power controller 422 may also include instructions for toggling between a sleep mode and an awake mode during which the multi-mode device node 400 transmits announcements at periodic intervals (e.g., every 10-50 ms) for a predetermined time period (e.g., for 30-60 seconds). If the multi-mode device node 400 receives a pairing request while awake—e.g., from an access device or another device node—then the multi-mode device node may pair and communicate with that access device or device node. The control logic 430 may also include instructions that terminate the connection if a communication (e.g., a command request) is not received for a predetermined time period (e.g., 60 seconds). Furthermore the control logic 430 may include instructions to reenter a sleep mode upon termination of a connection and upon failing to receive a pairing request while awake during the predetermined time period.

As also seen in FIG. 4, memory 426 of the low-power controller 422 also stores a device node database 436 and an access device database 438. The access device database 438 may be the same as or at least similar to the access device database 344 discussed above with reference to FIG. 3. In this regard, the access device database 438, in this example, may store records corresponding to the access devices that have paired and bonded with the multi-mode device node 400 and are thus authorized to access the multi-mode device node. The multi-mode device node 400 may bond with an access device by employing the procedures used to establish a communication session as described in commonly-owned U.S. Pat. No. 9,407,624. As noted above, an access node record may also include one or more keys associated with the access device and used by the low-power controller 422 to encrypt and decrypt content and communications transmitted to and received from the access device corresponding to that access device record. An access node record may also store an invitation code for an invited access device that has been authorized to communicate with the multi-mode device node 400.

The device node database 436, in this example, stores records of the next-level device nodes that are connected to the multi-mode device node 400 in the local network of interconnected devices. For a zero-level device node, the device node database 436 may thus store records corresponding to its child device nodes, i.e., the first-level device nodes in signal communication with that zero-level device node as well as the corresponding child device nodes of each of its child device nodes, i.e., the second-level device nodes in signal communication with those first-level device nodes. For a first-level device node, the device node database 436 may likewise store records corresponding to its child device nodes, i.e., the second-level device nodes in signal communication with that first-level device node. Accordingly, a device node record may include: the serial number of the child node and the network address assigned to the child node, the serial number of the parent node and the network address assigned to the parent node, the layer number of the parent node, and a registration status of the child node. The registration status of the child node may indicate whether the child node has been registered with an upper level device node. As an example, the device node record stored at a first-level device node for a second-level device node may indicate whether that second-level device node has been registered with a zero-level device node and/or a gateway device node.

The power module 406 of the multi-mode device node 400, in this example, includes a power port 440 for receiving power from an external power source and a power controller 442 for controlling the power supplied to one or more of the radios (not shown) of the multi-mode device node. As seen in FIG. 4, the power controller 442 is connected to the pairing button 412. Accordingly, like the pairing button 312 discussed above with reference to FIG. 3, the pairing button 412, when pressed by a user, may cause the power controller 422 to reduce the transmission power of the multi-mode device node 400 thus reducing its wireless range. Additionally or alternatively and similar to a gateway device node, a multi-mode device node may receive power via PoE, an energy harvesting device, or WPT.

It will be appreciated that some implementations of multi-mode device nodes may also include an internal power source such as a battery in addition to a power port for receiving power from an external power source. Multi-mode device nodes having both an internal and an external power source may also include a power switch for toggling whether the multi-mode device node is powered internally or externally as described above with reference to FIG. 3. In addition, a multi-mode device node may also include a wired LAN interface and corresponding wired LAN controller similar to those of the gateway device node 300 discussed above. In addition, other implementations of a multi-mode device node may store its node database and access device database in local memory rather than the memory of the low-power controller.

With reference now to FIG. 5, an example of an implementation of a dual-mode device node 500 is shown. Similar to the gateway device node 300 and the multi-mode device node 400, the dual-mode device node 500, in this example, includes a control module 502, a communication module 504, and a power module 506. The dual-mode device node 500, in this example, also includes an ignition button 508, a reset button 510, a pairing button 512, and an LED 514. The dual-mode device node 500 may also include a physical security token 516 affixed to the device node, e.g., to a housing of the device node. In other examples, a dual-mode device node may omit buttons 508-512 and may instead include only a single factory reset button used to restore the factory settings of the dual-mode device node. In some examples, a dual-mode device node may omit physical buttons entirely.

The ignition button 508, the reset button 510, and the pairing button 512 may be the same as or at least similar to, respectively, the ignition button 308, the reset button 310, and the pairing button 321 discussed above with reference to FIG. 3. In some example implementations, the dual-mode device node 500 may be configured to enter into a sleep mode if it is unable to connect to a local network of interconnected devices after a user presses the ignition button 508. Engaging the reset button 510 may cause the dual-mode device node to awake from the sleep mode and reattempt the process of locating a network to connect to. The physical security token 516 may also be the same as or at least similar to the physical security token 358 discussed above with reference to FIG. 3 and encode the same type of information associated with the dual-mode device node 500. If the ignition button 508 is omitted from a dual-mode device node, then that dual-mode device node may perform an initialization procedure automatically upon power-up.

The communication module 504 of the dual-mode device node 500, in this example, includes one communication interface. In particular, the communication module 504, in this example, includes a radio having a transceiver 520 and corresponding antenna 522. The radio 518 may be configured to operate at one or more frequencies within the ISM radio band. Accordingly the radio 518 may be, e.g., a 2.4 GHz and/or 5 GHz radio. Other types of radios and frequency bands suitable for wireless communications may be selectively employed. The radios discussed above with reference to the gateway device node 300 and the multi-mode device node 400 may be the same as or at least similar to the radio 518 of the dual-mode device node 500.

The control module 502 of the dual-mode device node 500, in this example, also includes a single controller 524 for handling and responding to the wireless communications received at and transmitted from the dual-mode device node. The controller 524, in this example, is also a dual-standard low-power controller ("low-power controller") configured to selectively utilize multiple low-power wireless communication standards to wirelessly communicate with access devices, a gateway device node, and other device nodes of the local network of interconnected devices. In some example implementations, the low-power controller 524 is configured to utilize both the BLE and ANT low-power wireless communication standards. As seen in FIG. 5, the low-power controller 524 is in signal communication with the radio 518.

The low-power controller 524 may be the same as or at least similar to the low-power controller 322 discussed above with reference to FIG. 3, e.g., an SoC. In this regard, the low-power controller 524 likewise includes a processor 526 and memory 528 storing instructions that are executed by the processor for controlling operational aspects associated with the dual-mode device node 500. The instructions stored at the memory 528 of the low-power controller 524, in this example, include instructions corresponding to a protocol stack 530 that is configured to handle and process multiple types of low-power wireless communications received at and transmitted from the dual-mode device node 500 (e.g., BLE communications and ANT communications) from access devices, a gateway device node, or other device nodes of the local network of interconnected devices. The protocol stack 530 of the low-power controller 524 may thus be the same as or at least similar to the protocol stack 332 of the low-power controller 322 discussed above with reference to FIG. 3.

The memory 528 of the low-power controller 524, in this example, also stores instructions corresponding to control logic 532, routing logic 534, and security logic 536 for controlling operational aspects of the dual-mode device node 500. The routing logic 534 and the security logic 536 may be the same as or at least similar to the routing logic 338 and security logic 340 discussed above with reference to the gateway 300 in FIG. 3. The routing logic 534 may thus also route communications to an access device, a gateway device node, or other device nodes of the local network of interconnected devices.

Like the security logic 434 of the multi-mode device node 400, the security logic 536 may similarly depend on the device node type of a dual-mode device node. The security modes included in the security logic 536 of the low-power controller 524 may thus depend on the risk associated with unauthorized access to the dual-mode device node (e.g., sensor-type device nodes versus lock-type device nodes). Accordingly where relatively less risk is associated with the dual-mode device node 500, the security logic 536 may include instructions corresponding to relatively less secure security modes. Likewise where relatively more risk is associated with the dual-mode device node 500, the security logic 536 may include instructions only corresponding to relatively more secure security modes. The security logic 536 of the low-power controller 524 may also be configured to employ a default security mode or a user-selected security mode.

The control logic 532 of the low-power controller 524 may likewise depend on the device node type of the dual-mode device node 500. Accordingly, the control logic 532 of the low-power controller 524 may be similar to the control logic 430 discussed above, e.g., with respect to activation-type dual-mode device nodes and sensor-type dual-mode device nodes. The control logic 532 of the low-power controller 524 may likewise include instructions that are not dependent on the device node type. In particular, the control logic 532 for each type of dual-mode device node may include instructions for initializing the dual-mode device node upon startup, searching for and connecting to a local network of interconnected devices to join (e.g., a gateway device node or another device node), responding to polling commands (e.g., transmitted by a gateway device node), adding a new device node to the network, registering that new device node with a gateway device node, removing a device node from the network, establishing a master/slave relationship with another device node, and exchanging communications with an access device. The control logic 532 of the low-power controller 524 may thus also include instructions for toggling between a sleep mode and an awake mode during which the dual-mode device node 500 transmits announcements at periodic intervals for a predetermined time period. The control logic 532 may thus likewise include instructions to terminate a connection and reenter a sleep mode if a communication is not received within a predetermined time period or reenter a sleep mode if a pairing request is not received in response to an announcement transmitted within a predetermined time period.

The memory 528 of the low-power controller 524 likewise stores a device node database 538 and an access device database 540. The access device database 540 may be the same as or at least similar to the access device databases 344 and 438 discussed above with reference to FIGS. 3-4. In this regard, the access device database 540, in this example, may store records corresponding to the access devices that have paired and bonded with the dual-mode device node 500 and are thus authorized to access the dual-mode device node. The dual-mode device node 500 may bond with an access device by employing the procedures used to establish a communication session as described in commonly-owned U.S. Pat. No. 9,407,624. As noted above, an access node record may also include one or more keys (e.g., a public key) associated with the access device and used by the low-power controller 524 to encrypt and decrypt content and communications transmitted to and received from the access device corresponding to that access device record as well as an invitation code generated for an invited access device that has been authorized to communicate with the dual-mode device node. The device node database 538 likewise stores records of the next-level device nodes that are connected to the dual-mode device node 500 in the local network of interconnected devices. Accordingly the device node database 538 and its corresponding device node records may be the same as or at least similar to the device node database 436 discussed above with reference to FIG. 4.

The power module 506 of the dual-mode device node 500, in this example, includes an internal power source, in particular, a battery 542 and a power controller 544 for controlling the power supplied to the radio 518. As seen in FIG. 5, the power controller 544 is connected to the pairing button 512. Accordingly, like the pairing button 312 discussed above with reference to FIG. 3, the pairing button 512, when pressed by a user, may cause the power controller 544 to reduce the transmission power of the dual-mode device node 500 thus reducing its wireless range. Additionally or alternatively and similar to a gateway device node and a multi-mode device node, a dual-mode device node may receive power via PoE, an energy harvesting device, or WPT.

It will be appreciated that some implementations of dual-mode device nodes may also include a power port for receiving power from an external power source in addition to a battery. Dual-mode device nodes having both an internal and an external power source may also include a power switch for toggling whether the dual-mode device node is powered internally or externally as described above with reference to FIG. 3. It will also be appreciated that in some implementations of gateway device nodes, multi-mode device nodes, and dual-mode device nodes one or more of the ignition button, the reset button, the pairing button, and the LED may be optional. In addition, other implementations of a dual-mode device node may store the device node database and access device database in local memory rather than in the memory of the low-power controller.

Referring now to FIGS. 6A-B, respective examples of implementations of two types of device nodes 600a and 600b are shown. In FIG. 6A, an activation-type device node 600a is shown, and in FIG. 6B, a sensor-type device node 600b is shown Like the device nodes discussed above, the activation-type device node 600a and the sensor-type device node 600b each include, respectively, a control module 602a and 602b. The control modules 602a and 602b may be the same as or similar to the control modules discussed above with respect to the gateway device node, the multi-mode device node, and the dual-mode device node. The control module 602a, in this example, is in signal communication with a motor control unit 604 (MCU) which is in turn in connected to an actuator 606. The control module 602a may issue commands to the MCU 604 which in turn triggers activation of the actuator 606 based on those commands. As noted above, activating the actuator 606 may include locking or unlocking a lock, automatically opening or closing a door (e.g., a garage door), and the like. Instead of an MCU 604 and actuator 606, other activation-type device nodes may include optical output devices (e.g., display screens, lights, etc.), audio output devices (e.g., speakers), solenoids, and the like that are connected to the control module 602a. The control module 602b, in this example, is in signal communication with a sensor 608. The control module 602a may thus issue commands to the sensor 608 as discussed above and/or receive data from the sensor (e.g., one or more sensor readings). Various types of sensors that may be employed will be appreciated with the benefit of this disclosure.

With reference to FIG. 6C, another example of an implementation of a device node 600c is shown. The device node 600c may correspond to any of the various types of device nodes described above. Like the device nodes 600a-b, the device node 600c includes a control module 602c. The device node 600c, in this example, also includes a physical switch 610 in signal communication with the control module 602c and accessible to a user. A user may engage the physical switch 610 to toggle the active/inactive status of the device node 600c and/or toggle the awake/asleep status of the device node. Accordingly, in some example implementations, the physical switch 610 may be the same as or at least similar to the ignition buttons or reset buttons discussed above. In an inactive state, the device node 600c may be completely powered down. In an active state, the device node may be powered up and either in an asleep state or an awake state. In the asleep state, the device node 600c may only listen for communications transmitted by other device nodes of the local network of interconnected devices. In response to receipt of a communication while in the asleep state, the device node 600c may enter the awake state and take some action, e.g., transmit a response to the communication received. In the awake state, the device node 600c may both listen for communications transmitted by other device nodes as well as transmit communications to other device nodes. The device node 600c may also perform other types of actions when in the awake state, e.g., trigger an actuator or obtain data measured by a sensor. If the device node 600c is in the inactive state, engaging the switch 610 activates the device node. A device node may be configured to enter either the asleep state or the awake state when activated, and the state the device node enters when activated may depend on the type of device. A keyfob, for example, may be configured to immediately enter the asleep state (i.e., power up and listen) when its physical switch is engaged. A door lock, however, may be configured to immediately enter the awake state when its physical switch is engaged and attempt to join the local network of interconnected devices (i.e., power up and transmit). In a similar fashion, a device node may be configured to either listen or immediately transmit when entering the awake state from the asleep state, i.e., wake up and listen versus wake up and transmit. Additional examples will be appreciated with the benefit of this disclosure.

As noted above, the control logic of the respective controllers at the gateway device nodes, multi-mode device nodes, and the dual-mode device nodes include instructions for forming a local network of interconnected devices, securing and routing communications along pathways through and to device nodes of the network, and responding to commands received in those communications. These functional aspects are discussed in further detail below.

Message Broker

Figure 7:
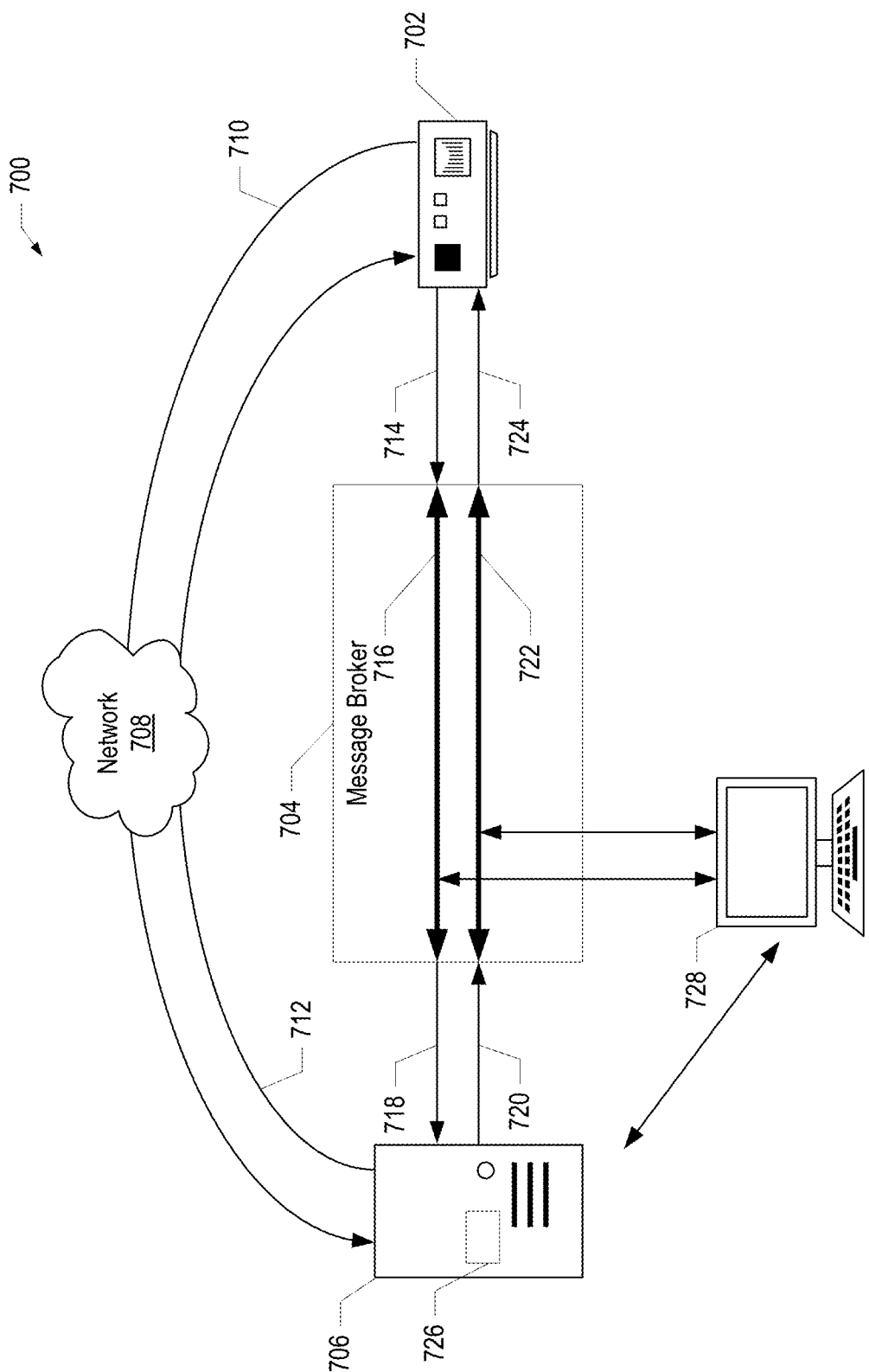
FIG. 7 depicts an example of an implementation of a system that utilizes a messaging broker in accordance with aspects described herein.

FIG. 7 illustrates an example environment 700 in accordance with aspects described herein. The environment 700, in this example, includes an example bridge computing device 702 that communicates, through an example broker device 704, with an example device management server 706. The bridge computing device 702, in this example, may include features and perform functions similar to those of the gateway device node 102, the gateway device 202, or the gateway device node 300 discussed above. The bridge computing device 702 further monitors its power-on state, transmits provisioning requests, connects to the message broker 704, publishes and/or subscribes to message broker channels, monitors connectivity to the server 706 or to the message broker 704, routes device node communications to the server 706 or the message broker 704, and/or notifies secondary bridge devices to take over device communication routing as further disclosed herein.

The message broker 704, in this example, provides multiple channels on which devices may publish and/or subscribe to in order to communicate with other devices in the environment 700. In some examples, a channel may be uniquely associated with a particular device in the environment or with a set of devices in the environment (e.g., some or all device nodes of a local network of interconnected devices). In other examples, a channel may be associated with a topic (e.g., device errors, device diagnostics, and the like). In some examples, a publish-subscribe messaging protocol may be employed to publish and receive messages. In some examples, the broker device 704 uses message queue telemetry transport (MQTT) publish-subscribe messaging protocol to facilitate communications between the bridge computing device 702 and the server 706. The broker device 704 may connect with some or all of the devices disclosed herein.

The server 706, in this example, may include features and perform functions similar to those of the device management server 110 or the device management server 212 discussed above. The server 706 further generates and provides provisioning responses, connects to the message broker 704, publishes and/or subscribes to message broker channels, authenticates third-party users and/or devices, receives device communication access requests, provides encryption keys, and/or communicates with device nodes through one or more bridge computing devices.

The features and functionality of the bridge computing device 702, the broker device 704, and the server 706 will be described in further detail below. It should be appreciated that other examples of a bridge computing device may include any combination of features and functionality described herein with respect to the bridge computing device 702 and the gateway device nodes 102, 202, and 300. It should also be appreciated that other examples of a server may include any combination of features and functionality described herein with respect to the server 706 and the device management servers 110 and 212.

Power-On Provisioning

In some examples, the bridge computing device 702 initially communicates, through a network 708, with the server 706. Such initial communication may occur in response to the bridge computing device 702 powering on. Here, the bridge computing device 702 transmits, to the server 706 and through the network 708, a provisioning request 710. In response, the server 706 transmits, to the bridge computing device 702 and through the network 708, a provisioning response 712. The provisioning response 712 may include a network address associated with the message broker 704, one or more channels to which the server 706 will publish future messages, and/or one or more channels to which the bridge computing device 702 should publish future messages. The message broker 704 implements a publish-subscribe messaging protocol (e.g., MQTT) and provides the respective channels to which the bridge computing device 702 and the server 706 publish their messages. In this way, the bridge computing device 702 obtains the information it needs to obtain messages published by the server 706 as well as the information it needs to provide messages to the server. Accordingly, the server 706 subscribes to the channel(s) the bridge computing device 702 publishes its messages, and, in a similar fashion, the bridge computing device subscribes to the channel(s) the server publishes its messages. Various types of channels may be used to exchange message between a server and one or more bridge computing devices. Examples of such channels are discussed in further detail below. In addition to transmitting a provisioning request in response to achieving a power-on state, the bridge computing device 702 may also be configured to transmit a provisioning request at other times or in response to other events as discussed in further detail below.

Following the initial provisioning process, the bridge computing device 702 and the server 706, in this example, communicate through the message broker 704 using the channels the server indicated in the provisioning response 712. For example, the bridge computing device 702 publishes 714 a first message to a first channel 716. The server 706 subscribes 718 to the first channel 716 in order to receive the first message. Similarly, the server 706 publishes 720 a second message to a second channel 722. The bridge computing device 702 subscribes 724 to the second channel 722 to receive the second message.

The channels through which the server 706 and the bridge computing device 702 communicate may, in some examples, be unknown to third-parties. In addition, the payloads of the messages between the server 706 and the bridge computing device 702 may be encrypted with one or more of the device-specific keys associated with the bridge computing device 702.

The server 706, in this example, includes an interface 726 that enables third-parties to identify channels and/or interact with (e.g., read/write) messages communicated through identified channels. The interface 726 may be a physical device interface, an application programming interface (API), or a combination thereof. The interface 726 may be incorporated within the server 706 as shown in FIG. 7. Alternatively, the interface 726 may be a standalone device in communication with the server 706.

A third-party computing device 728 may communicate, via the interface 726, with the server 706 to identify the first channel 716 to which the bridge computing device 702 publishes its messages, identify the second channel 722 to which the server 706 publishes its messages, and/or obtain the device-specific encryption keys associated with the bridge computing device to decrypt messages communicated across the first channel 716 or the second channel 722. In some examples, the server 706 may validate the identity of the third-party computing device 728 to determine whether the third-party computing device 728 is authorized to receive such information. Such validation may include determining whether the server 706 and/or the bridge computing device 702 have previously communicated with the third-party computing device 728, whether the third-party computing device 728 is on an authorized device list, whether the third-party computing device 728 has authorization credentials, or any combination thereof. Upon successful validation and authorization, the third-party computing device 728 may publish and/or subscribe to the first channel 716 and/or the second channel 722.

Device-specific channels may be used to exchange one-to-one messages between the server and a particular bridge computing device. A server may only publish device-specific messages (e.g., messages intended for consumption by a particular bridge device) to a device-specific channel associated with that bridge device. Similarly, a device-specific channel associated with a particular bridge computing device may only publish messages from that bridge computing device and no other bridge computing device. A provisioning response may thus indicate one device-specific channel a bridge computing device should subscribe to (e.g., in order to receive device-specific messages published by the server) and another device-specific channel the bridge computing device should publish to. A server may publish and subscribe to multiple device-specific channels in order exchange device-specific messages with multiple bridge computing devices. A bridge computing device and a server may both publish and subscribe to the same device-specific channel.

Account-specific channels may be used to exchange messages between the server and multiple bridge computing devices associated with a particular user account. A server may publish account-specific messages (e.g., messages intended for consumption by multiple bridge computing devices associated with a particular user account) to an account-specific channel associated with that user account. Similarly, an account-specific channel associated with a user account may publish messages from multiple bridge computing devices of that user account. A provisioning response may thus indicate one account-specific channel a bridge computing device should subscribe to (e.g., in order to receive account-specific messages published by the server) and another account-specific channel the bridge computing device should publish to (which other bridge computing devices of the corresponding user account may also publish to). A server may publish and subscribe to multiple account-specific channels in order to exchange account-specific messages with bridge computing devices associated with different user accounts. A bridge computing device and a server may both publish and subscribe to the same account-specific channel.

Account-specific channels may also be used to exchange messages between multiple bridge computing devices of the same user account. In this way, one bridge computing device may send a message to another bridge computing device on the same user account without having the server process the message. Multiple bridge computing devices associated with a user account may publish messages to an account-specific channel associated with that user account (e.g., messages intended for consumption by other bridge computing devices associated with that user account). Those bridge computing devices may also subscribe to that account-specific channel (e.g., in order to receive messages published by other bridge computing devices associated with that user account). A provisioning response may thus indicate an account-specific channel a bridge computing device should both publish and subscribe to (which other bridge computing devices associated with that user account may also publish and subscribe to). Some user accounts may be associated with multiple, discrete local networks of interconnected devices. Accordingly, an account-specific channel may additionally or alternatively be used as described above in order to exchange messages between multiple bridge computing devices of a particular local network of interconnected devices.

Furthermore, the user account may be one way to group bridge computing devices. Bridge computing devices may be grouped according to other criteria or characteristics. More generally, group-specific channels may be used to exchange messages between the server and multiple bridge computing devices associated with a particular group. A server may publish group-specific messages (e.g., messages intended for consumption by multiple bridge computing devices associated with a particular group) to a group-specific channel. Similarly, a group-specific channel associated with a particular group of bridge computing devices may publish message from multiple bridge computing devices of that group. A provisioning response may thus indicate one group-specific channel a bridge computing device should subscribe to (e.g., in order to receive group-specific messages published by the server) and another group-specific channel the bridge computing device should publish to (which other bridge computing devices of the group may also publish to). A server may publish and subscribe to multiple group-specific channels in order to exchange group-specific messages with bridge computing devices across different groups. A bridge computing device and a server may both publish and subscribe to the same group-specific channel.

Bridge computing devices may be grouped according to various characteristics or criteria. Some examples of the ways bridge computing devices may be grouped include grouping by firmware version, grouping by deployment location (e.g., residence, business, school), grouping by the type of device node deployed in the local network of interconnected devices (e.g., has multi-mode device node, has dual-mode device node, has lock-type device node, has sensor-type device node), geographic location, and the like. A bridge computing device may also belong to more than one group. Accordingly, a provisioning response may indicate multiple group-specific channels a bridge computing device should publish and/or subscribe to.

Reporting channels may be used to provide reporting messages published by a bridge computing device. Reporting messages may include, for example, diagnostic information about a bridge computing device. The server and/or a third-party may subscribe to a reporting channel in order to receive the reporting messages published by a bridge computing device. A bridge computing device may not subscribe to a reporting channel and instead only publish to a reporting channel. Multiple bridge computing devices may publish to the same reporting channel, and a bridge computing device may publish respective messages to multiple reporting channels. Some examples of different types of reporting channels a bridge computing device may publish to include a reporting channel to publish error codes when an error occurs at the bridge computing device, a reporting channel to publish status updates and/or changes about the bridge computing device, a reporting channel to publish usage information about the bridge computing device, and the like. In some examples, a bridge computing device may publish all types of reporting messages to a single reporting channel. A provisioning response may the indicate one or more reporting channels a bridge computing device should publish to.

A provisioning response may indicate one or more of the various types of channels described above in various combinations. For example, a provisioning response sent to a bridge computing device may indicate at least one device-specific channel the bridge computing device should publish and/or subscribe to, at least one account-specific channel, at least one group-specific channel, and at least one reporting channel that the bridge computing device should publish and/or subscribe to. A provisioning response may indicate additional and alternative combinations and permutations of the various types of channels described herein.

A bridge computing device and a server may publish different types of messages to one or more channels each respectively subscribes to. The messages discussed below are provided by way of example only. A bridge computing device may publish additional or alternative messages which will be appreciated with the benefit of this disclosure.

A bridge computing device may publish an asynchronous event ("AsyncEvent") message to indicate an event initiated by a device node (e.g., a lock event, an unlock event, an open event, a close event, a sensor reading event, and the like). A bridge computing device may publish a device assignment ("AutoAssignDevice") message to indicate that a bridge computing device has discovered and paired with a new device node. A bridge computing device may publish a status update ("UpdateDeviceStatus") message when a child device node connects and/or disconnects to the bridge computing device.

A bridge computing device may publish a device list request ("DeviceList") message to request from the server a list of all device nodes the server considers to be associated (e.g., paired) with that bridge computing device. The server may, in turn, publish a device list response message that includes a list of those device nodes. The device list response message may also include, for each device node listed, one or more device-specific encryption keys associated with the corresponding device node.

A bridge computing device may publish a server time request ("EpochTimeRequest") message to request the current server time of the server. The server may, in turn, publish a server time response message with the current server time (e.g., the number of seconds elapsed since Jan. 1, 1970). The bridge computing device may update its internal clock based on the server time indicated in the server time response message to ensure its internal clock is synchronized with the server clock. The bridge computing device may publish the EpochTimeRequest message at regular or irregular intervals.

A bridge computing device may publish a message ("LastWillAndTestament") when the bridge computing device establishes a connection with the message broker. In the event the bridge computing device loses its connection with the message broker, the message broker may send the LastWillAndTestament message to the server to inform the server that the connection between the message broker and the bridge computing device has been lost. In this way, the server may determine that the bridge computing device has disconnected from the message broker.

A bridge computing device may publish a firmware version check ("FirmwareVersionCheck") message to request the most recent version number of the firmware at the bridge computing device. Examples of such firmware include the protocol stack, the network controller, and the like. The FirmwareVersionCheck message may request the version number(s) for all firmware of the bridge computing device, some of the firmware of the bridge computing device, or a particular firmware of the bridge computing device. The server may, in turn, publish a firmware version response message that indicates the most recent version of the specified firmware. Based on the firmware version indicated in the response, the bridge computing device may determine whether an upgrade to the firmware is available.

A server may publish a firmware information ("FirmwareInformation") message indicating the file size (e.g., number of bytes) for a firmware file. The firmware file may be an upgrade to the firmware of a bridge computing device. The FirmwareInformation message may also include a checksum value for the firmware file. Based on the file size indicated in the FirmwareInformation message, a bridge computing device may determine how many "chunks" of the firmware file it will need to request from the server to receive the firmware file from the server. The bridge computing device may also use the checksum value to validate the firmware file once it has received all of the "chunks" and reassembled the firmware file locally at the bridge computing device.

A bridge computing device may publish a firmware file chunk request message indicating a range of bytes of a firmware file. The server may, in turn, publish a firmware file chunk retrieval ("FirmwareFileChunkRetrieval") message that includes the requested byte range, i.e., a "chunk" of the firmware file. The FirmwareFileChunkRetrieval message may also include a confirmation that the requested byte range is included as well as a checksum value for the "chunk" provided. The bridge computing device may use the checksum to validate the "chunk" and confirm the bytes in the requested byte range has been received.

A bridge computing device may publish a firmware information ("UpdateFirmwareInformation") message on behalf of a child device node to provide the server with information about the firmware at that child device node. The server may, in turn, store information about the firmware of the child device node. The server may provide the firmware information to an access portal (e.g., access portal 210 in FIG. 2) and/or a control application at an access device (e.g., access device 208 in FIG. 2) for inspection (e.g., for debugging, troubleshooting, etc.). A bridge computing device may also publish an UpdateFirmwareInformation message to provide the server with information about the firmware of the bridge computing device itself.

The server and bridge computing device may, in some examples, subscribe and publish to a firmware channel that is set aside for firmware-related messages. In this way, a particular channel may be dedicated for performing firmware version checks, providing firmware information, and distributing firmware upgrades.

Figure 8:
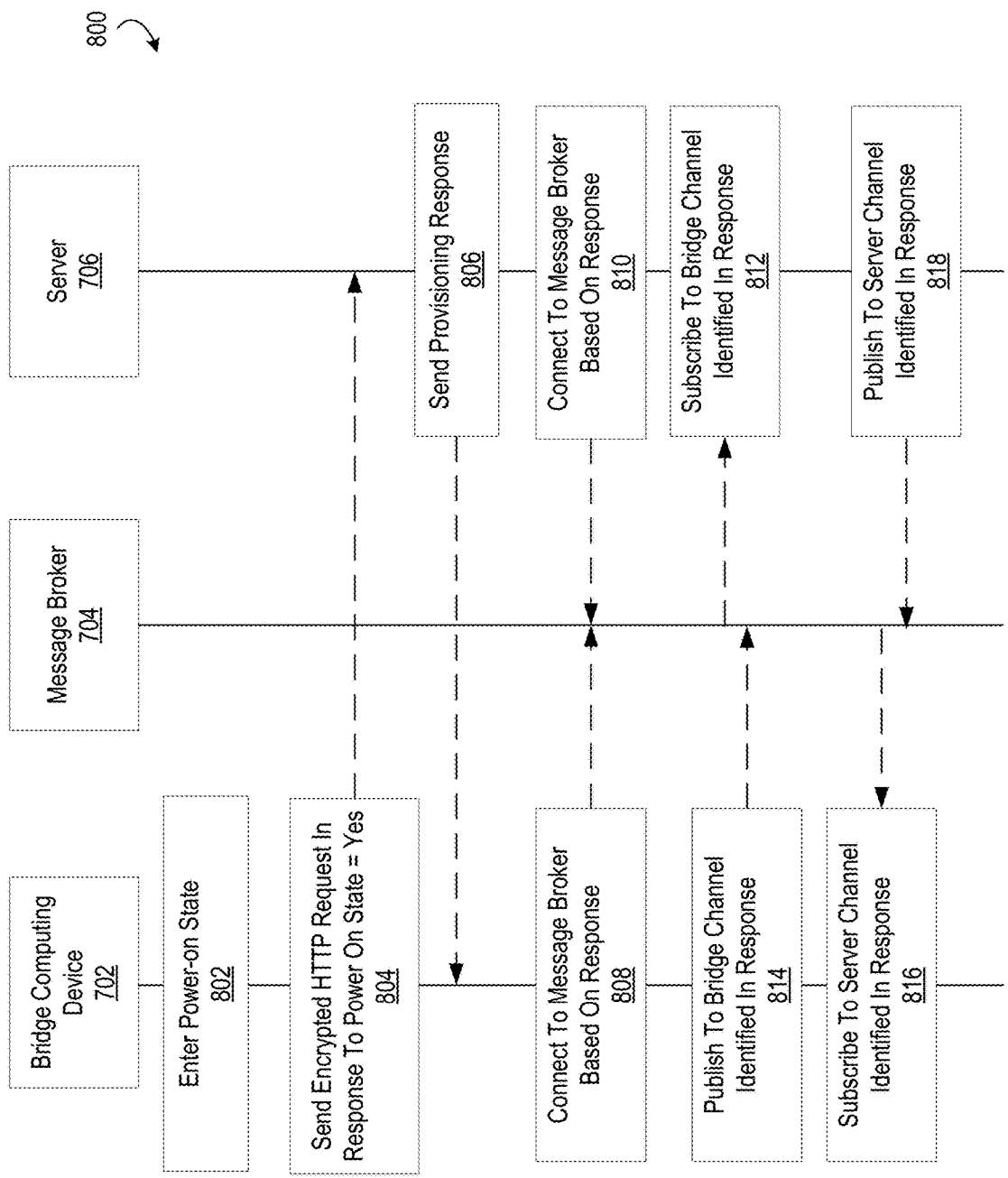
FIG. 8 depicts a sequence diagram of example method steps for providing power-on provisioning in accordance with aspects described herein.

FIG. 8 depicts a sequence diagram 800 of example method steps for providing power-on provisioning. The steps described with reference to FIG. 8 may be performed in the context of the environment 700 discussed above. The power-on provisioning process may begin with the bridge computing device 702 entering a power-on state (802). The power-on state may be a result of a reset, a user-initiated power-on command, an automated power-on command (e.g., as a result of a power outage), or any other command that results in the bridge computing device 702 having enough power to operate. In response to the bridge computing device 702 achieving the power-on state, the bridge computing device 702 sends, to the server 706, a provisioning request (804). In some examples, the provisioning request includes an encrypted Hypertext Transfer Protocol (HTTP) request message. In some examples, the provisioning request includes a number of elements including headers such as, for example, Accept, X-AntSN, X-IV, Content-Type, X-ApiVersion, X-MsgType.

Table 1 illustrates example descriptions of data associated with the aforementioned example headers:

TABLE 1

Provisioning Request Headers

| Header Element | Description |
|---|---|
| Accept | application/json |
| X-AntSN | Serial number of bridge computing device. |
| X-IV | 16-byte initialization vector used by the bridge device to encrypt the request. This is used by a provisioning service, in addition to the encryption key assigned to the bridge device that is stored in a structured query language (SQL) database, to decrypt the request. |
| Content-Type | application/json |
| X-ApiVersion | Version of the provisioning service protocol used to generate the request. |
| X-MsgType | Enumeration of possible message types sent by a device to the provisioning service. |

As identified in Table 1, the "Accept" header and the "Content-Type" header indicate the MIME type used for data formatting, e.g., application/json in this example. The "X-AntSN" header corresponds to an identifier of the bridge computing device 702. The identifier may be a serial number associated with the bridge computing device 702 during manufacture or a unique sequence of numbers assigned to only the bridge computing device 702. The "X-IV" header may indicate an initialization vector that is combined with an encryption key to encrypt the provisioning request. The initialization vector may be 16 bytes in some examples. In some examples, the encryption key combined with the initialization vector may be a device-specific encryption key associated with the bridge computing device 702.

The server 706 may store, in memory, multiple encryption keys that are assigned to respective bridge computing devices with which the server 706 interacts. For example, the server 706 may interact with three different bridge computing devices and store three different encryption keys respectively assigned to those bridge computing devices. The server 706 may associate an identifier of a bridge computing device (e.g., a serial number) with a stored encryption key so that the server 706 can distinguish between the different encryption keys. In some examples, the bridge computing device 702 transmits an identifier to the server 706, and the server 706 identifies the respective encryption key associated with the bridge computing device 702 based on the transmitted identifier.

The "X-ApiVersion" header corresponds to information indicating a provisioning service protocol version for the provisioning request, the provisioning response, and the provisioning message. The "X-MsgType" header may correspond to information indicating one of multiple possible message types that the bridge computing device 702 and/or the server 706 may publish. Such message types may be used to ensure that the devices communicating are authorized to do so. For example, if a message type appears that is not associated with the multiple message types identified in the provisioning request, a security breach may be identified.

In response to receiving the provisioning request, the server 706 may decrypt, with the first encryption key and/or the second encryption key, the provisioning request. In such examples, communications between the server 706 and the bridge computing device 702 may be secured and confidential with respect to third-parties (e.g., other parties besides server 706 and bridge computing device 702).

In response to receiving and/or decrypting the provisioning request, the server 706 prepares a provisioning response. In some examples, the provisioning response includes information such as an address of the message broker 704, an identification of a first channel to which the server 706 will publish its messages, an identification of a second channel to which the bridge computing device 702 should publish its messages, and/or a timeframe for which the first channel and the second channel is or will be available for publication or subscription (e.g., between 1:00 AM and 2:00 AM). For example, as an additional layer of security, the first and/or second channel may be utilized by the server 706 and/or the bridge computing device 702 for publication/subscription only for a limited time (e.g., utilization of the first and/or second channel may expire), thereby decreasing the window in which an unauthorized party could access the first and/or second channel. In some such examples, upon expiration of the first and/or second channels, the bridge computing device 702 may send a second provisioning request and the server 706 may send a second provisioning response identifying new channels to which the bridge computing device 702 and the server 706 to may publish/subscribe. The bridge computing device 702 may transmit the subsequent provisioning request in response to a determining that the first and/or second channels are no longer available, e.g., after the timeframe for using them has expired.

In some examples, the server 706 encrypts the provisioning response with the first encryption key and/or the second encryption key. The server 706 may send the provisioning response to the bridge computing device 702 (806). As illustrated in FIG. 7, the provisioning request and the provisioning response may be sent via network 708.

Below is an example of a provisioning response:

```
{    "Header":
        { "Ver": 1,
          "Time": 1489185825 },
     "Error": 0,
     "AntNetworkId": "0xA6BC",
     "AccountGuid": "dd81d702-c4cc-43ed-9816-4877195f36a6",
     "BrokerAddress": "creative-beagle.qmr.cloudamqp.com",
     "CleanSession": 1,
     "KeepAlivePeriod": 60,
     "Password": "xxxxxxxxxxxxxxxxxxxxxxxxxxxxxxxxxxxxxxx",
     "ServerName": "MQ9",
     "TopicPattern": "11-9-6",
     "TopicSubscriptionPattern": "11-91",
     "UserId": "xxxxxxxx:xxxxxxxxx",
     "Port": 1883,
     "ZoneKey": null }
```

EXAMPLE 1

Provisioning Response

Based on the provisioning response, the bridge computing device 702 connects to the message broker 704 (808) Likewise, the server 706 connects to the message broker 704 based on the provisioning response (810). For example, the bridge computing device 702 and/or the server 706 locate the message broker 704 based on the address of the message broker 704 (e.g., "BrokerAddress"). Once the server 706 connects with the message broker 704, the server 706 can subscribe to the second channel (e.g., "bridge channel") to which the bridge computing device 702 should publish its messages (812). In some examples, the server 706 subscribes to the bridge channel identified in the response prior to the bridge computing device 702 publishing a message (814). However, in some examples, the server 706 may subscribe to the bridge channel at any time such as, for example, before, at the same time, or after the bridge computing device 702 publishes a message. Although FIG. 8 depicts the server 706 connecting to the message broker 704 (e.g., 810) after sending the provisioning response (e.g., 806), in other examples, the server may maintain a persistent connection to the message broker. In this regard, the server 706 may automatically connect to the message broker 704 upon power-up of the sever and may automatically reestablish a connection with the message broker in the event an existing connection is lost.

In some examples, the bridge computing device 702 subscribes to the first channel or topic (e.g., "server channel") to which the server 706 will publish its messages (816). In some examples, the bridge computing device 702 subscribes to the server channel identified in the response prior to the server 706 publishing a message (818). However, in some examples, the bridge computing device 702 may subscribe to the server channel at any time such as, for example, before, at the same time, or after the server 706 publishes a message.

In some examples, the provisioning request, the provisioning response, and/or the provisioning messages may include the following example format:

[ServerID]/[BridgeComputingDeviceID]/[MessageType]/[EncryptionVector]/[Payload]

EXAMPLE 2

Provisioning Request/Response/Message Format

In some examples, the request, response, and messages may be transmitted in an "Envelope" and "Letter" format. In such examples, the "Envelope" of the request, response, or messages may be clear, unencrypted text whereas the "Letter" (e.g., payload) of the message may be encrypted. In some examples, the "Envelope" portion of the message may include information corresponding to the origin of the message, the message type, and the vector used to encrypt the payload of the message. In some examples, the request, response, and messages may include the JSON format. In some examples, the server 706, the bridge computing device 702, and/or the third-party computing device 728 may maintain persistent transmission control protocol (TCP) connections to the message broker 704.

In some examples, the published messages may include instructions from the server 706 and/or requests from the bridge computing device 702. For example, the server 706 may send instructions to the bridge computing device 702 to update a child device node, to communicate with access devices and device nodes in a local network of interconnected devices, to initialize bridge computing device 702 and/or one or more child device nodes (e.g., setting various operating parameters such as, the operating frequency, the security mode, etc.), to route and secure communications, to control operational aspects of the bridge computing device 702 and one or more child device nodes, to connect with additional child device nodes, to remove child device nodes, to change the status of a child device node, to report status information pertaining to the bridge computing device 702 and/or pertaining to one or more child device nodes, etc. In some examples, the bridge computing device 702 sends requests for one or more of the above identified instructions.

In some examples, any party subscribed to a channel in which messages are published, may receive those messages automatically. For example, a rich site summary (RSS) feed may deliver any and all messages published to the subscribed-to channel. The publish/subscribe relationship may last indefinitely. In some examples, the publish/subscribe relationship may last for the timeframe set forth in the provisioning response.

The publish/subscribe protocol described above enables the bridge computing device 702 and/or the server 706 to send messages to any party that subscribes to its respective publishing channel. In such examples, a single message may be sent to any number of parties, provided the parties are subscribed to the correct channel. In some such examples, any party may receive messages from a channel, however, may not have the encryption key required to decrypt the payload of the received messages. Accordingly, the secure publish/subscribe protocol provides a scalable message delivery system without sacrificing the security of those messages. Furthermore, by carrying out the provisioning process upon power-up of the bridge computing device 702, both the server 706 and the bridge computing device 702 obtain the information needed to communicate using the message broker 704 prior to interaction with any device nodes. Moreover, by employing a message broker 704 to facilitate communications between the bridge computing device 702 and the server 706, a third-party may monitor those communications and/or provide communications of its own.

The provisioning response may also be used to provide a bridge computing device with message broker failover information. The provisioning response may include information indication one or more backup message brokers that may be used in the event that the connection with a primary message broker is lost. For example, a provisioning response may include a list of multiple message broker server addresses a bridge computing device may connect to in order to subscribe to channels and publish messages to channels. The list of message broker server addresses may include a server address for a primary message broker as well as a server address for a secondary message broker. The list of message broker server addresses may include between 2-n message broker server addresses for a primary message broker and one or more backup message brokers. In the event that a bridge computing device loses its connection to the primary message broker, that bridge computing device may automatically attempt to connect to the secondary message broker and re-subscribe to the channels indicated in the provisioning message received upon power-up. If the bridge computing device loses its connection to the secondary message broker, it may automatically attempt to connect to a tertiary message broker, and so forth, depending on how many message broker server addresses the provisioning response includes.

The device management server (e.g., device management server 706 in FIG. 7) may also retain the list of message broker server address provided to a bridge computing device. Accordingly, if the device management server loses its connection to a primary message broker or receives a LastWillandTestament message from the primary message broker indicating a bridge computing device has lost its connection with the primary message broker, the device management server may similarly attempt to connect to a secondary message broker and re-subscribe to the channels the bridge computing device publishes to. The device management server may maintain persistent connections to one or more backup message brokers. Additionally or alternatively, the device management server may connect to a backup message broker after losing its connection to a primary message broker and/or after receiving a LastWillandTestament message from a message broker. By providing a bridge computing device with information indicating backup message brokers, any disruptions in the connection with a message broker may be minimized.

Third Party Messaging

Using a message broker as described above provides the opportunity for third-parties to access the messages exchanged between the bridge computing device and the server. Here, a third-party includes a party that does not deploy, manage, or otherwise control a local network of interconnected devices. For example, an end user may deploy, manage, and control a local network of interconnected devices at a dwelling or office. In this regard, the end user may be considered to be associated with that local network of interconnected devices. The bridge computing device of the local network of interconnected devices may, in this example, be configured to publish diagnostic messages on a specific diagnostic channel provided by the message broker. The diagnostic messages may be generated by the bridge computing device itself and/or the device nodes of the local network of interconnected devices. A manufacturer of the device nodes may subscribe to the diagnostic channel in order to obtain the diagnostic messages pertaining to the device nodes of the network, which may be useful for troubleshooting, compiling operational statistics, and the like. The manufacturer, in this example, is thus one example of a third-party that might access the messages exchanged between the bridge computing device and the server.

A third-party also includes a party that is not primarily responsible for managing a local network of interconnected devices but nevertheless shares the responsibility for managing a local network of interconnected devices. For example, an enterprise such as a business, school, or other organization may deploy multiple local networks of interconnected devices, e.g., at respective rooms or floors of a structure, at respective buildings of a campus, and the like. While a party associated with a room, floor, building, etc., may be primarily responsible for managing its local network of interconnected devices, a third-party (e.g., a building or campus security office) may share in the responsibility of managing the various local networks of interconnected devices deployed throughout the organization. That third-party may subscribe to one or more channels to which the server and/or bridge device publishes, e.g., in order to monitor the messages exchanged therebetween. The third-party may also publish messages to a third-party channel provided by the message broker and subscribed to by the server and/or bridge computing device. In this way, the third-party may provide its own messages to the bridge computing device and/or the device nodes of a local network of interconnected devices. In this regard, accessing the channels provided by a message broker includes both subscribing to a channel to receive messages published to that channel as well as publishing messages to a channel provided by the message broker. It will thus be appreciated that the provisioning the bridge computing device upon power-up may also include instructing the bridge computing device to subscribe to a third-party channel provided by the message broker, i.e., a channel a third-party publishes message to.

Figure 9:
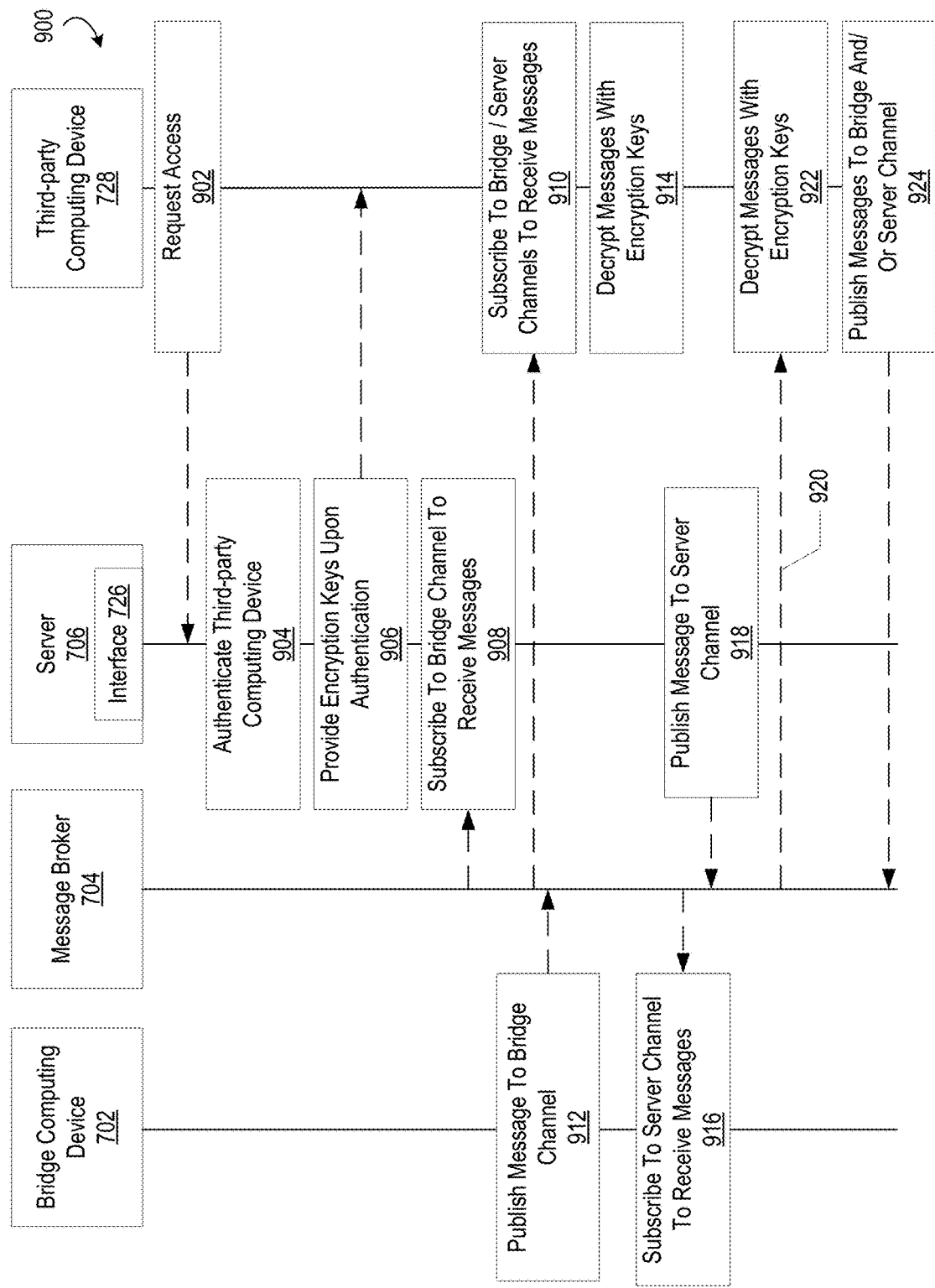
FIG. 9 depicts a sequence diagram of example method steps for third-party messaging in accordance with aspects described herein.

FIG. 9 depicts a sequence diagram 900 of example method steps for third-party messaging. The steps described with reference to FIG. 9 may be performed in the context of the environment 700 discussed above. The third-party messaging process may begin with a third-party, through the third-party computing device 728, requesting, via the interface 726 of the server 706, read and/or write access to communications involving one or more bridge computing devices (902). In some examples, the access request includes a request to access other devices in communication with the one or more bridge computing devices that form a mesh network (e.g., one or more device nodes of a local network of interconnected devices).

The third-party computing device 728 may request different types of access to communications provided via the message broker 704. For example, the third-party computing device 728 may generally request, from the server 706, access to all communications. The third-party computing device 728 may also request access to communications from a particular device by providing, for example, an identifier of the particular device. In addition, the server 706 may provide, to the third-party computing device 728, access to communications without a request from the third-party computing device 728.

In some examples, the server 706 may be configured to authenticate the third-party computing device 728 in response to receipt of an access request from the third-party computing device 728 (904). Various means of authenticating the third-party computing device 728 may be selectively employed. For example, the third-party computing device 728 may be authenticated via a set of access credentials (e.g., a username and password, a digital certification, and the like.) In some examples, to authenticate the third-party computing device 728, the server 706 may determine whether a third-party user profile and/or a third-party device profile is identified in an authorized list of user profiles and/or an authorized list of device profiles. In response to successful authentication of the third-party computing device 728, the server 706 may provide, to the third-party computing device 728, one or more encryption keys (906). The server 706 may provide, in some examples, a general encryption key, such as, for example, a public encryption key. The server 706 may also provide one or more device-specific encryption keys associated with the bridge computing device 702 or end devices in a mesh network with the bridge computing device 702. The one or more encryption keys may include, for example, 128-bit encryption keys. In this way, the third-party computing device 728 may decrypt encrypted messages published by the bridge computing device 702 and/or the server 706 that have been encrypted using a device-specific encryption key of the bridge computing device 702 or other mesh network devices associated with the bridge computing device 702. In a similar fashion, the third-party computing device 728 may use a device-specific encryption key to encrypt messages intended for consumption by only the bridge computing device 702 or other mesh network devices associated with the bridge computing device 702. The server 706 also provides, to the third-party computing device 728, the channel information for the bridge computing device 702 and/or the server, e.g., the respective channels to which the bridge computing device 702 and the server 706 publish their respective messages.

If it has not done so already, the server 706 subscribes to the bridge channel at the message broker 704 in order to receive messages published by the bridge computing device 702 (908). Similarly, the third-party computing device 728 subscribes to the server channel and/or the bridge channel at the message broker 704 in order to receive messages published by the server 706 and/or the bridge computing device 702 (910). In some examples, such subscription may occur before, at the same time as, or after the bridge computing device 702 publishes a message to the bridge channel (912). Having subscribed to the bridge channel, the third-party computing device can obtain messages published by the bridge computing device 702 to that channel. If encrypted, the third-party computing device 728 may use one or more of the encryption keys it has received to decrypt any messages published on the bridge channel (914). It will be appreciated that the bridge computing device 702 may publish respective messages to more than one bridge channel. The third-party computing device 728 may subscribe to one, some, or all of the bridge channels to which the bridge computing device 702 publishes its respective messages.

If it has not done so already, the bridge computing device 702 subscribes to the server channel at the message broker 704 in order to receive messages published by the server 706 (916). In some examples, such subscription may occur before, at the same time as, or after the server 706 publishes a message to the server channel (918). Having subscribed to the server channel (910), the third-party computing device can obtain messages published by the server 706 to that channel. If encrypted, the third-party computing device 728 may use one or more of the encryption keys it has received to decrypt any messages published on the server channel (922). It will be appreciated that the server 706 may publish respective messages to more than one server channel. The third-party computing device 728 may subscribe to one, some, or all of the server channels to which the sever 706 publishes its respective messages. The third-party computing device 728 may also publish its own messages to the bridge channel and/or server channel (924).

Figure 10:
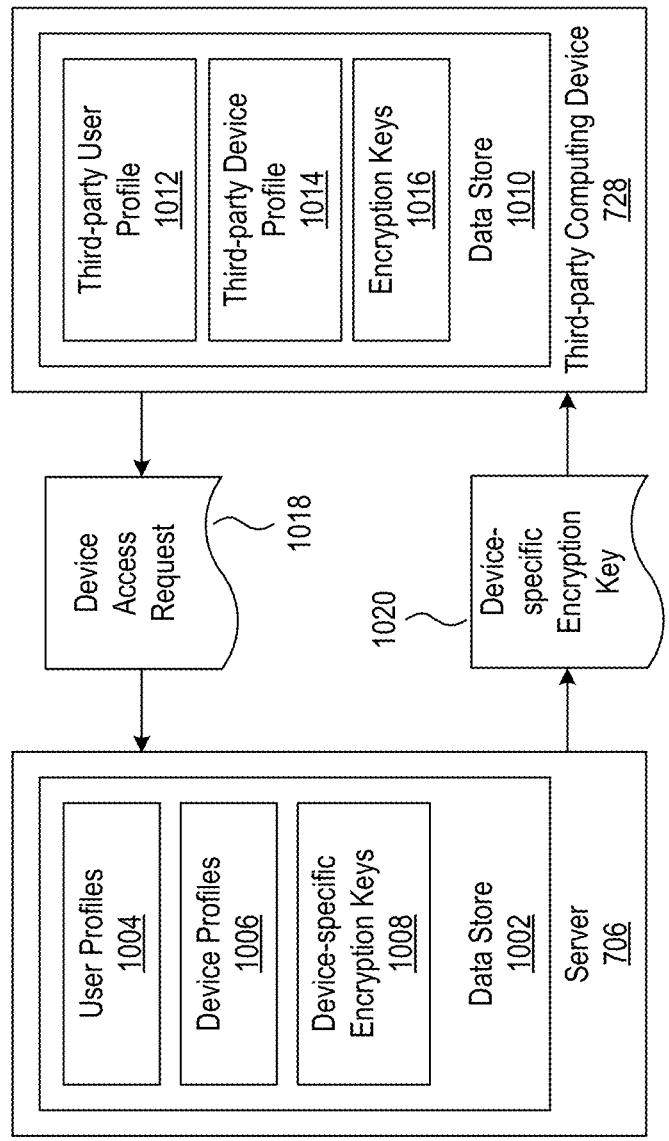
FIG. 10 depicts an example of an implementation of a server and a third-party computing device in accordance with aspects described herein.

FIG. 10 illustrates example implementations of the server 706 and the third-party computing device 728 of FIG. 7. The server 706, in this particular example, includes a data store 1002 storing multiple user profiles 1004, multiple device profiles 1006, and multiple device-specific encryption keys 1008. The user profiles 1004 and the device profiles 1006, in this example, are included in a list identifying user/device profiles authorized for communications with the server 706 and/or the bridge computing device 702. The server 706 stores the device-specific encryption keys 1008 in association with respective identifiers of the device nodes of a local network of interconnected devices.

The third-party computing device 728, in this particular example, includes a data store 1010 storing a third-party user profile 1012, a third-party device profile 1014, and multiple encryption keys 1016. As described with reference to FIG. 9, the third-party computing device 728 transmits a device access request 1018 including the third-party user profile 1012, the third-party device profile 1014, and an identifier of the device(s) for which the third-party computing device 728 would like to monitor communications and/or communicate with. To authenticate and authorize the third-party computing device 728, the server 706 may compare the third-party user profile 1012 to the user profiles 1004 stored within the data store 1002 and/or compare the third-party device profile 1014 the device profiles 1006 stored within the data store 1002. If the server 706 determines that the third-party user profile 1012 corresponds to one of the user profiles 1004 and/or determines that the third-party device profile 1014 corresponds to one of the device profiles 1006, then the server 706 may authenticate the third-party computing device 728. In response to successful authentication of the third-party computing device 728, the server 706 may determine, based on the identifier of the device(s) within the device access request 1018, which device-specific encryption key of the encryption keys 1016 to provide to the third-party computing device 728. The server 706 may transmit, to the third-party computing device 728, the determined device-specific encryption key(s) 1020. In this way, the third-party computing device 728 may decrypt encrypted messages published by the corresponding device and encrypted using that the determined device-specific encryption key(s). The third-party computing device may also use the device-specific encryption key(s) received to encrypt messages intended for consumption by that device.

As disclosed above, third-party users and third-party computing devices 728 may "listen in" (e.g., subscribe to) and publish to channels through which the server 706 and the bridge computing device 702 are communicating. The third-party users and third-party computing devices 728 may utilize such access to perform diagnostic monitoring; analyze sensor data, usage, and/or traffic (e.g., big data analysis); initiate one or more commands; provide notifications; monetize collected data; etc.

Example Local Network of Interconnected Devices

Figure 11:
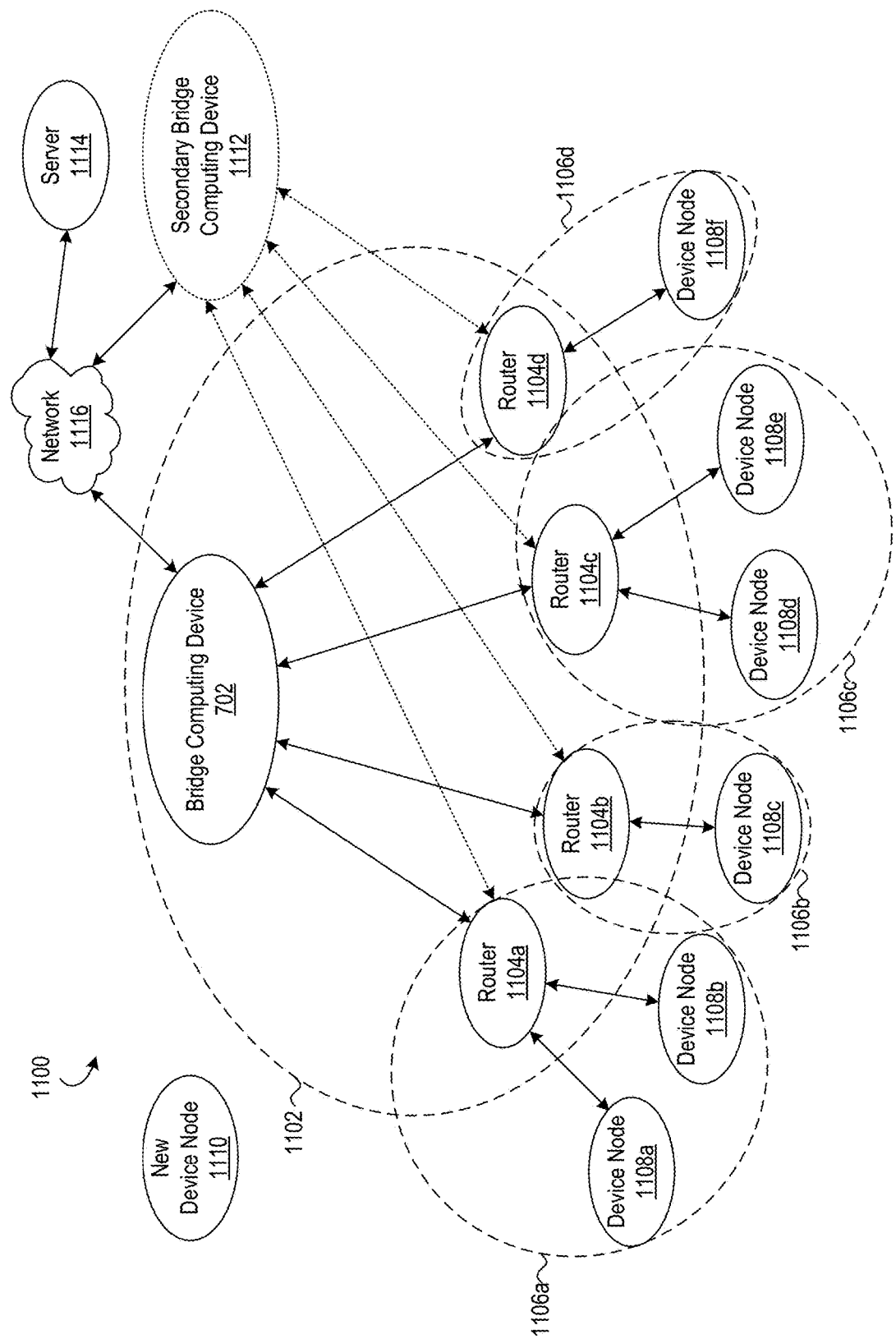
FIG. 11 depicts an example of an implementation of a local network of interconnected devices in accordance with aspects described herein.

Referring now to FIG. 11, another local network of interconnected devices 1100 ("network") is shown. In FIG. 11, the hierarchical arrangement of the network 1100 is similar to that shown with respect to FIG. 2. A first hierarchical arrangement 1102, in this example, includes the bridge computing device 702 and multiple routers 1104a-1104d that are in signal communication with the bridge computing device 702. In some examples, the bridge computing device 702 may be configured such that only a maximum number of routers 1104 can connect to the bridge computing device 702 at one time. The maximum number of routers may be a hardware limitation, which may increase as technology advances. The maximum number of routers may be a user-configurable parameter in some example implementations of a bridge computing device.

The network 1100, in this example, also includes multiple second hierarchical arrangements 1106a-1106d, which each respectively include one of the routers 1104a-1104d and one or more device nodes 1108a-1108f. For example, hierarchical arrangement 1106a includes router 1104a and device nodes 1108a and 1108b, hierarchical arrangement 1106b includes router 1104b and device node 1108c, hierarchical arrangement 1106c includes router 1104c and device nodes 1108d and 1108e, and hierarchical arrangement 1106d includes router 1104d and device node 1108f. In some examples, each router 1104 may be configured such that only a maximum number of device nodes 1108 can connect to the router 1104 at one time. The maximum number of device nodes may be a hardware limitation, which may increase as technology advances. The maximum number of device nodes may be a user-configurable parameter in some example implementations of a router.

As similarly disclosed with respect to FIG. 2, the routers 1104a-1104d and the bridge computing device 702 may be within respective wireless ranges and thus in direct signal communication with each other. The device nodes 1108a-1108f may be outside the wireless range of the bridge computing device 702, but within the wireless range of a respective router 1104. Thus, the device nodes 1108*a*-1108*f* may be in direct signal communication with the routers 1104*a*-1104*d* and in indirect signal communication with the bridge computing device 702 via a respective router 1104. In examples further disclosed herein, a new device node 1110 may be introduced to the network 1100. In examples further disclosed herein, a secondary bridge device 1112 may transition into example network 1100 to replace bridge computing device 702, supplement the bridge computing device 702, or serve as a back-up to the bridge computing device 702.

Load Balancing

Figure 12:
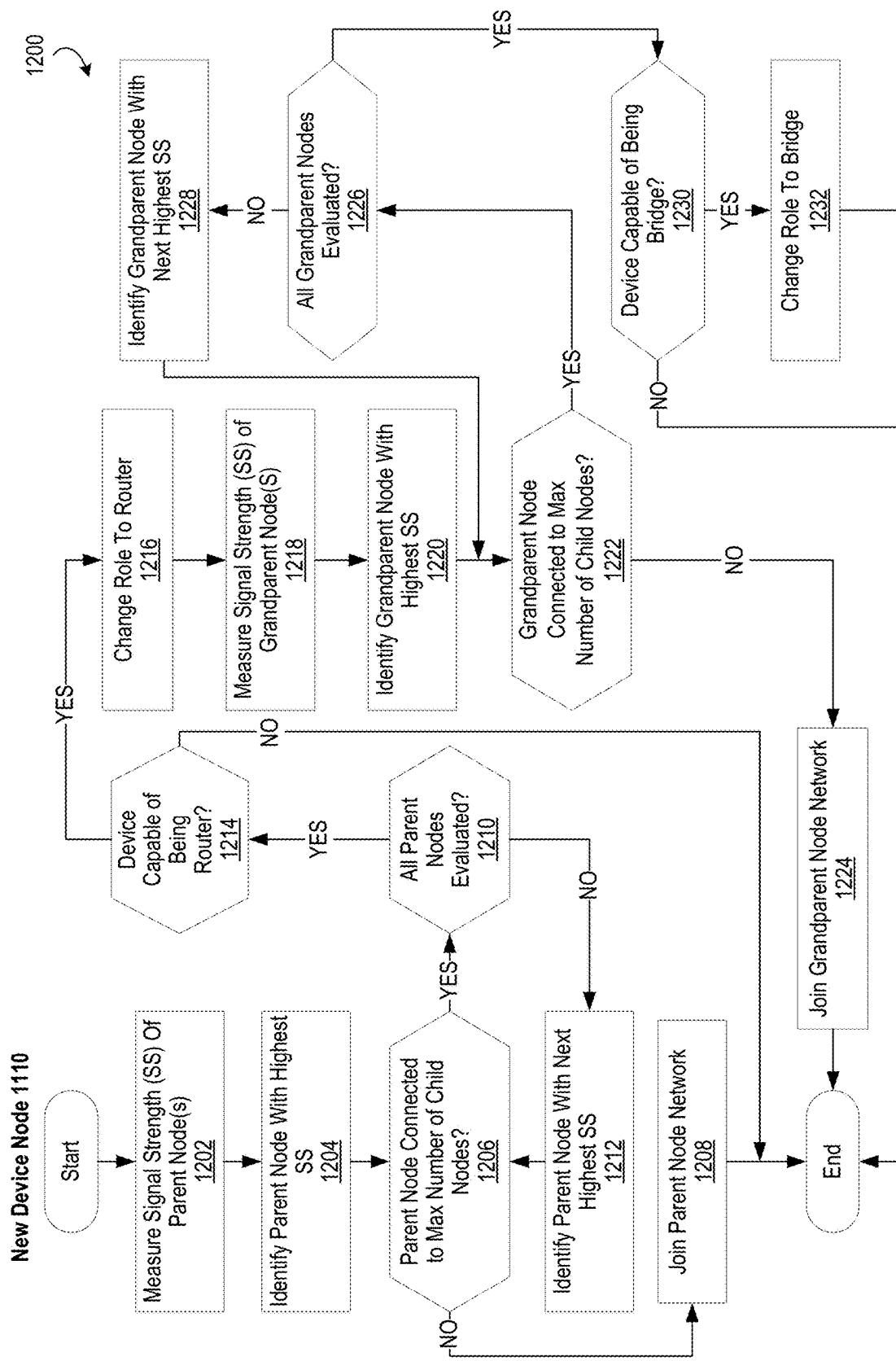
FIG. 12 depicts a flowchart of example method steps for load balancing in a local network of interconnected devices in accordance with aspects described herein.

FIG. 12 depicts a flowchart 1200 of example method steps for load balancing in a local network of interconnected devices. The steps depicted in FIG. 12 may be performed, for example, to perform load balancing in the local network 1100 of FIG. 11. Accordingly, the steps depicted in FIG. 12 are described by way of example in the context of the new device node 1110 of FIG. 11 attempting to join the network 1100. As described below, load balancing may be performed at the network 1100 in response to the new device node 1110 joining the network 1100. The load balancing process, in this example, begins with the new device node 1110 measuring the signal strength (SS) of parent node(s) (1202). In some examples, the parent nodes correspond to the routers 1104*a*-1104*d*, such that the bridge computing device 702 may be considered a grandparent node. In some examples, the bridge computing device 702 may also be a parent node. In some examples, the bridge computing device 702 may be a parent node relative to one device node while being a grandparent node relative to another device node. In some examples, the device nodes 1108*a*-1108*f* may be parent nodes or grandparent nodes to other device nodes.

After measuring the SS of the parent nodes, the new device node 1110 identifies the parent node with the highest SS (1204). For example, the new device node 1110 may identify router 1104*a* as having the highest SS. Having determined the parent node with the highest SS, the new device node 1110 determines whether that parent node is connected to its maximum number of child nodes (1206). For example, if the maximum number of child nodes is 2, then router 1104*a* may already be connected to the maximum number of child nodes. If the new device node 1110 determines that the parent node with the highest SS is not connected to its maximum number of child nodes (1206:N), then the new device node 1110 joins the network 1100 as a child node of the identified parent node (1208).

If, however, the new device node 1110 determines that the parent node with the highest SS is connected to its maximum number of child nodes (1206:Y), then the new device node 1110 determines whether all parent nodes have been evaluated for being connected to their maximum number of child nodes (1210). If there are additional parent nodes that have not yet been evaluated (1210:N), then the new device node 1110 identifies the parent node with the next highest SS (1212). The new device node 1110 then iteratively repeats steps 1206-1210 until it identifies a parent node with the highest SS that is not connected to its maximum number of child nodes, if one is available.

If all parent nodes have been evaluated (1210:Y) and all are connected to their maximum number of child nodes (1206:Y), then the new device node 1110 may take steps to nevertheless join the network 1100. For example, the new device node 1110, in this example, determines whether it could act as a router (1214). In some example implementations, a device of a local network of interconnected devices may be able to function as a device node, a router, a bridge device, or any combination thereof. In some examples, while a device node may perform functions of a router or a bridge device, the device node may not include the same hardware configurations, such that the device node may support a different maximum number of child nodes, may have different processing power, storage, etc. If the new device node 1110 determines that it could act as a router (1214:Y), then the new device node 1110 may change its role to a different type of device. Otherwise, the new device node 1110 may be unable to join the local network of interconnected devices as the network may be at capacity for those types of devices.

In this example, the new device node 1110 changes its role from device node to router (1216) if it cannot locate a suitable parent node. Accordingly, the new device node 1110 now measures the signal strength (SS) of the grandparent node(s) (e.g., bridge computing device 702) (1218). Similar to the parent nodes, the new device node 1110 identifies the grandparent node with the highest SS (1220). Having identified the grandparent node with the highest SS, the new device node 1110 determines whether the identified grandparent node is connected to its maximum number of child nodes (1222). If the new device node 1110 determines that the grandparent node with the highest SS is connected to its maximum number of child nodes (1222:N), then the new device node 1110 joins the network 1100 as a router for the identified grandparent node.

If, however, the new device node 1110 determines that the grandparent node with the highest SS is connected to its maximum number of child nodes (1222:Y), then the new device node 1110 determines whether all grandparent nodes have been evaluated for being connected to their maximum number of child nodes (1226). If there are additional grandparent nodes that have not yet been evaluated (1226:N), then the new device node 1110 identifies the grandparent node with the next highest SS (1228). The new device node 1110 then iteratively repeats steps 1222-1228 until it identifies a grandparent node with the highest SS that is not connected to its maximum number of child nodes, if one is available.

If all grandparent nodes have been evaluated (1226:Y) and all are connected to their maximum number of child nodes (1222:Y), then the new device node 1110 may take additional steps to join the network. For example, the new device node 1110. in this example, determines whether it could function as a bridge (1230). If the new device node 1110 is capable of functioning as a bridge (1230:Y), then the new device node 1110 changes its role from router to bridge (1230) to join the network 1100 as a bridge-type device node.

Bridge Transitioning

Figure 13:
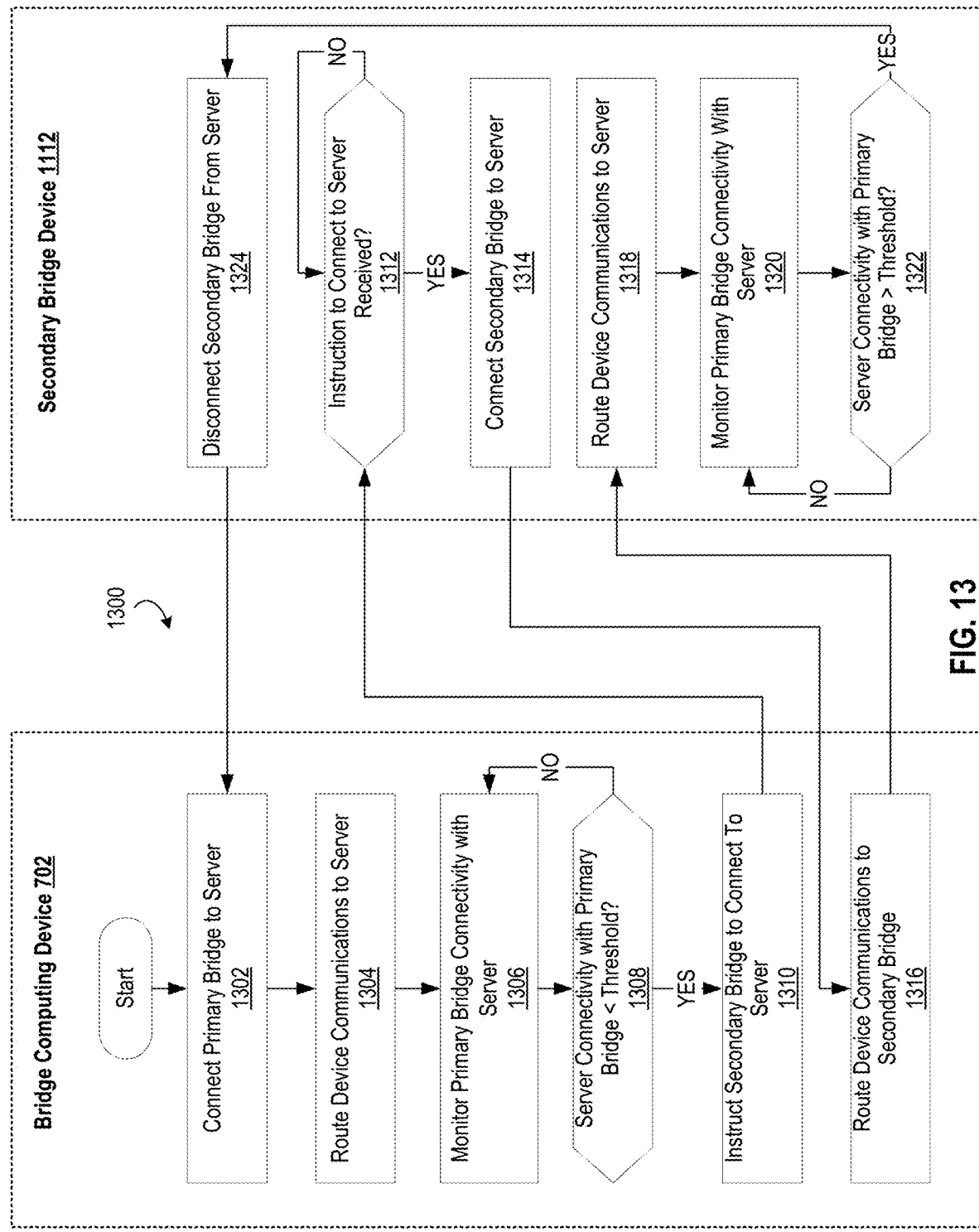
FIG. 13 depicts a flowchart of example method steps for bridge transitioning in a local network of interconnected devices in accordance with aspects described herein.

FIG. 13 depicts a flowchart 1300 of example method steps for bridge device transitioning in a local network of interconnected devices. The steps depicted in FIG. 13 may be performed, for example, to transition between the bridge computing device 702 and the secondary bridge device 1112 in the network 1100 of FIG. 11. Accordingly, the steps depicted in FIG. 13 are described by way of example in the context of the secondary bridge device 1112 of the network 1100 in order to replace, supplement, or serve as a backup to the bridge computing device 702. The secondary bridge device 1112 may assume responsibility for routing communications to or from a remote server in the event connectivity between the bridge device 702 and the remote server is lost or diminished. In this regard, the bridge computing device 702 may be considered to be the primary bridge of the network 1100, and the secondary bridge device 1112 may be considered to be the secondary, or backup bridge of the network 1100. The bridge device 702 may resume responsibility for routing communications to or from the remote server when connectivity is reestablished or improves. In this regard, the secondary bridge device 1112 may serve as a temporary replacement for the bridge computing device 702 so as to avoid or mitigate disruptions in the communications exchanged between the remote server and the device nodes of a local network of interconnected devices. In some examples, the secondary bridge device 1112 takes over for the bridge computing device 702 based on signal connectivity falling below a threshold. In some examples, the secondary bridge device 1112 may take over for the bridge computing device 702 based on a power level falling below a threshold, a processing capacity falling below a threshold value, a storage capacity falling below a threshold, etc.

The bridge transitioning process begins, in this example, with the bridge computing device 702 (e.g., primary bridge device) connecting to the server 1114. In some examples, the bridge computing device 702 may connect to the server 1114 via example network 1116. In some examples, the bridge computing device 702 may connect to a message broker (e.g., message broker 704 in FIG. 7), in order to send and receive messages as described above. Accordingly, the remote server may be a device management server (e.g., device management server 110 in FIG. 1) or a message broker (e.g., message broker 704 in FIG. 7) as described above. While connected to the server 1114, the bridge computing device 702 routes some or all communications that it receives from its child nodes (e.g., communications from the device nodes of the network 1100) to the server 1114 (1304). In a similar fashion, the server 1114 routes its communications through the bridge computing device 702 to the child nodes of the network 1100.

During operation, the bridge computing device 702 monitors its connection with the server 1114 (1306). Here, the bridge computing device 702 evaluates whether its connection with the server 1114 falls below a predetermined threshold (1308). If the bridge computing device 702 determines that its connection with the server 1114 has not fallen below the predetermined threshold (1308:N), then the bridge computing device may continue to operate normally and continue to monitor its connection with the remote server 1114 (1306). Determining that connectivity has fallen below a predetermined threshold may include determining that connectivity has been lost completely or that a connectivity measurement (e.g., network latency, available bandwidth, etc.) has crossed a predetermined measurement threshold. However, if the bridge computing device 702 determines that its connection with the server 1114 has fallen below the predetermined threshold (1308:Y), then the bridge computing device 702 notifies the secondary bridge device 1112 to connect to the server 1114. The bridge computing device 702 may use a low power protocol (e.g., BLE, ANT, etc.) to provide the instruction to the secondary bridge device 1112.

With the bridge computing device operating normally, the secondary bridge device 1112 waits to receive an instruction to connect to the server 1114. If the secondary bridge device 1112 does not receive such an instruction (1312:N), then the secondary bridge device 1112 may continue to wait, e.g., by listening for instructions transmitted by the bridge computing device 702. Upon receipt of an instruction to connect to the server 1114 (1312:Y), the secondary bridge device 1112 connects to the server 1114 (1314).

With the secondary bridge device 1112 connected to the server 1114, the bridge computing device 702 routes some or all communications that it receives from its child nodes (e.g., communications from the device nodes of the network 1100) to the secondary bridge device 1112. The secondary bridge device 1112 then routes those communications to the server 1114 (1318). In a similar fashion, the secondary bridge device 1112 routes communications from the server 1114 through the bridge computing device 702 for delivery to the child nodes of the network 1100. The secondary bridge device 1112 may likewise use a low-power protocol (e.g., BLE, ANT, etc.) to transmit the communications from the server to bridge computing device 702. By routing communications through the secondary bridge device 1112 during disruptions to the connectivity between the bridge computing device 702 and the server 1114 are transparent to the child device nodes of the network 1100.

In this example, the secondary bridge device 1112 monitors the connection between the bridge computing device 702 and the server 1114 (1320). In other examples, the bridge computing device 702 itself may monitor its connection to the server 1114 and resume responsibility for routing communications to or from the server 1114 in the event the connection is reestablished or improves relative to the predetermined threshold. In this regard, a primary bridge may additionally or alternatively provide a subsequent instruction to the secondary bridge to disconnect from the remote server.

While monitoring the connection between the bridge computing device 702 and the server 1114, the secondary bridge device 1112 evaluates whether the connection between the bridge computing device 702 and the server 1114 rises above the predetermined threshold (1322). If that connection has risen above the predetermined threshold (1322:Y), then the secondary bridge device 1112 disconnects from the server 1114 (1324) and the bridge device 702 resumes responsibility for routing communications between the server 1114 and the child nodes of the network 1100. If, however, that connection has not risen above the predetermined threshold (1322:N), then the secondary bridge device 1112 may continue to monitor the connection to evaluate whether connectivity has been reestablished or improved. In some examples, the secondary bridge device 1112 disconnects from the server 1114 at substantially the same time as the bridge computing device 702 connects to the server 1114. In some examples, the secondary bridge device 1112 disconnects from the server 1114 after the bridge computing device 702 connects to the server 1114. In some examples, the secondary bridge device 1112 may maintain a persistent connection to the server 1114 and simply route any communications to or from the server upon receipt, e.g., from the bridge computing device 702 or the server 1114. In some examples, the bridge transition process is halted upon a timeout occurring during any of the steps described above. In some examples, the bridge transitioning process is halted upon looping for a predetermined amount of time or a predetermined number of iterations.

Computing Environment

Figure 14:
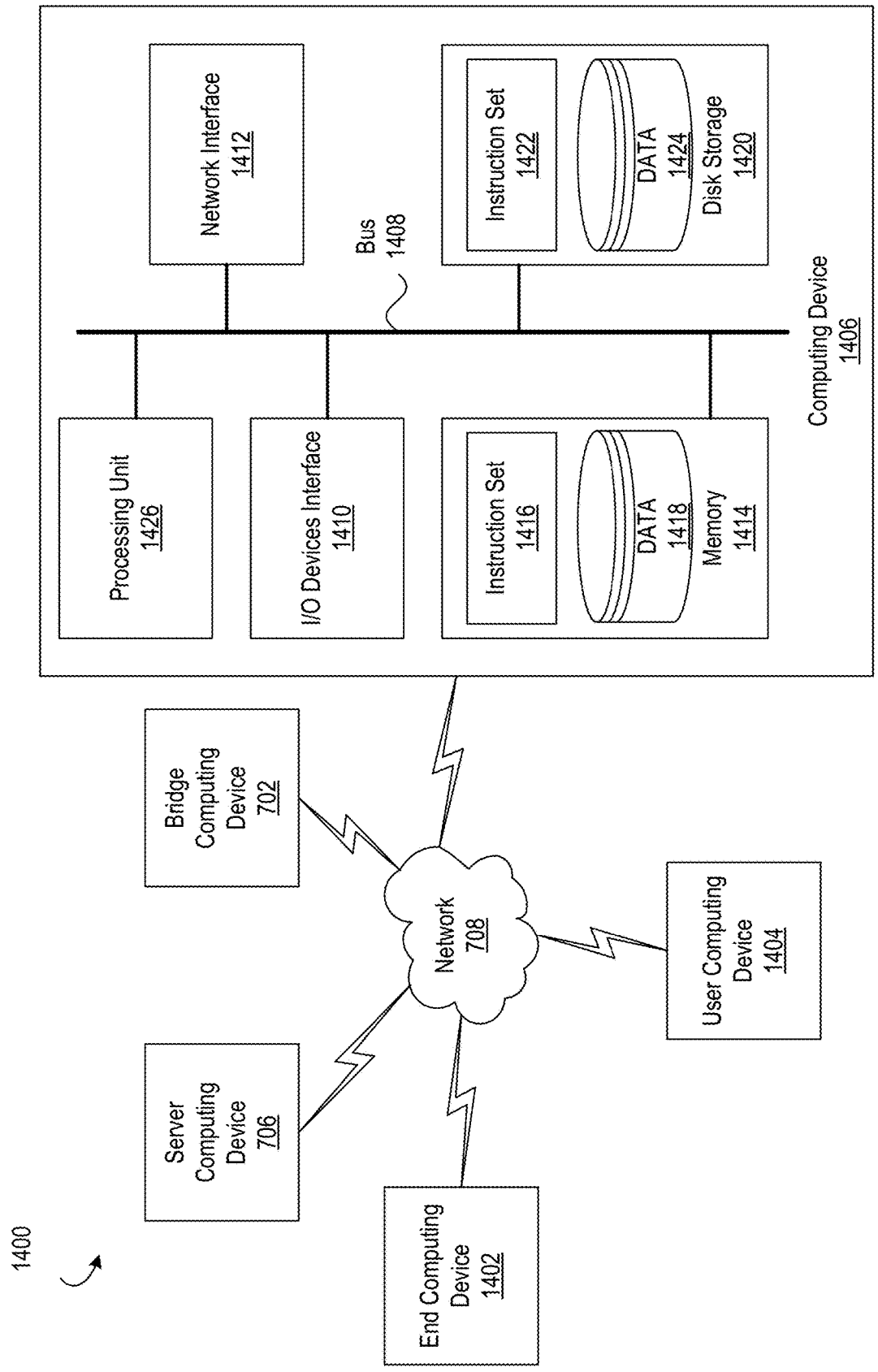
FIG. 14 depicts an example of an implementation of a computing environment in which aspects of the present disclosure may be implemented.

Referring now to FIG. 14, an example of an implementation of a computing environment 1400 in which aspects of the present disclosure may be implemented is shown. The computing environment may include both client computing devices 1402 and server computing devices 1404. The client computing devices 1402 and server computing devices 1404 may provide processing, storage, input/output devices, application programs, and the like. Client computing devices 1402 may include, e.g., desktop computers, laptop computers, tablet computers, palmtop computers, smartphones, smart televisions, and the like. Client computing devices 1402 may also be in signal communication to other computing devices, including other client devices computing devices 1402 and server computing devices 1404 via a network 1406. The network 1406 may be part of a remote access network, a wide area network (e.g., the Internet), a cellular network, a worldwide collection of computers, local area networks, and gateways that currently use respective protocols (e.g., FTP, HTTP, TCP/IP, etc.) to communicate with one another. Other electronic device architectures and computer network architectures may be selectively employed.

FIG. 14 also depicts a block diagram of one of a computing device 1407 of the computing environment 1400. The computing device 1407 contains a bus 1408 the computing device utilizes to transfer information among its components. The bus 1408 connects different components of the computing device 1407 (e.g., processor, disk storage, memory, input/output ports, network ports, etc.) and enables the transfer of information between those components. An I/O device interface 1410 is connected to the bus 1408. The I/O device interface 1410 connects various input and output devices (e.g., keyboard, mouse, microphone, camera, displays, printers, speakers, etc.) to the computing device 1407. A network interface 1412 is also attached to the bus 1408 and enables the computing device 1407 to connect to various other devices attached to a network (e.g., network 1406). The memory 1414 provides volatile storage for one or more instruction sets 1416 and data 1418 used to implement aspects described herein. Disk storage 1420 provides non-volatile storage for one or more instruction sets 1422 (e.g., an operating system) and data 1424 used to implement various aspects described herein. The processing unit 1426 is also attached to the bus 1408 and executes the instructions stored in the memory 1414 and/or the disk storage 1420. The instruction sets 1416 and 1422 as well as the data 1418 and 12424 include a computer program product, including a computer-readable medium (e.g., a removable storage medium such as one or more DVD-ROM's, CD-ROM's, diskettes, tapes, etc.) that provides at least a portion of the software instructions for implementing aspects of the present disclosure. At least a portion of the instructions may also be downloaded via the network 1406. As noted above, computer-readable media include all non-transitory computer-readable media and do not include transitory propagating signals.

One or more aspects of the disclosure may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as, e.g., HTML, XML, JavaScript, and the like. The executable instructions may be stored on a computer readable medium such as a hard disk, optical disk, removable storage media, solid state memory, RAM, ROM, etc. In some examples, the instructions may be stored on a tangible computer-readable storage medium, which, is expressly defined herein to include storage devices or storage discs and to exclude transmission media and propagating signals. The functionality of the program modules may be combined or distributed as desired in various embodiments. In addition, the functionality may be embodied in whole or in part in firmware or hardware equivalents such as integrated circuits, field programmable gate arrays (FPGAs), and the like. Various data structures may be used to more effectively implement one or more aspects of the disclosure, and such data structures are contemplated to be within the scope of the executable instructions and computer-usable data described herein.

Aspects of the disclosure have been described in terms of illustrative embodiments thereof. While illustrative systems and methods as described herein embodying various aspects of the present disclosure are shown, it will be understood that the disclosure is not limited to these embodiments. Modifications may be made particularly in light of the foregoing teachings. For example, the steps illustrated in the illustrative figures may be performed in other than the recited order, and one or more steps illustrated may be optional in accordance with aspects of the disclosure. It will also be appreciated and understood that modifications may be made without departing from the true spirit and scope of the present disclosure. One or more of the elements described above may be removed, rearranged, or supplemented without departing from the scope of the present disclosure. The description is thus to be regarded as illustrative instead of restrictive on the present disclosure.

We claim:

1. A system comprising:
 a first computing device configured to connect a local network of interconnected devices to a wide area network, the first computing device comprising:
  one or more first processors; and
  first memory storing first instructions that, when executed by the one or more first processors, cause the first computing device to:
   transmit, after achieving a power-on state, a provisioning request; and
 a second computing device in signal communication with the first computing device, the second computing device comprising:
  one or more second processors; and
  second memory storing second instructions that, when executed by the one or more second processors, cause the second computing device to:
   receive, from the first computing device, the provisioning request,
   generate a provisioning response comprising:
    first information indicating a first channel, provided by a message broker that implements a publish-subscribe messaging protocol, to which the first computing device shall publish one or more first messages, and
    second information indicating a second channel, provided by the message broker, to which the second computing device shall publish one or more second messages,
   subscribe to the first channel; and
   transmit, to the first computing device, the provisioning response;
  wherein the first instructions, when executed, further cause the first computing device to subscribe to the second channel after receiving the provisioning response.

2. The system of claim 1, wherein:
the first instructions, when executed, further cause the first computing device to transmit, to the second computing device, an identifier; and
the second instructions, when executed, further cause the second computing device to identify, based on the identifier, a device-specific encryption key associated with the first computing device.

3. The system of claim 1, wherein:
the second instructions, when executed, further cause the second computing device to transmit, to a third computing device, information indicating a channel to which the first computing device shall publish one or more messages; and
receipt of the information by the third computing device causes the third computing device to subscribe to the channel.

4. The system of claim 1, wherein:
the first channel to which the first computing device shall publish the one or more first messages is a device-specific channel that no other computing device of the local network of interconnected devices publishes to.

5. The system of claim 1, wherein:
the second instructions, when executed, further cause the second computing device to transmit, to a third computing device, a device-specific encryption key associated with the first computing device.

6. The system of claim 5, wherein:
publication, by the first computing device and to a channel provided by the message broker, of a message causes the third computing device to decrypt, using the device-specific encryption key, at least a portion of the message that the first computing device has encrypted using the device-specific encryption key.

7. The system of claim 5, wherein:
the first instructions, when executed, further cause the first computing device to decrypt, using the device-specific encryption key and after publication of a message by the third computing device to a channel provided by the message broker, at least a portion of the message that the third computing device has encrypted using the device-specific encryption key.

8. The system of claim 1, wherein:
the first instructions, when executed, further cause the first computing device to:
  encrypt at least a portion of a first message of the one or more first messages using a device-specific encryption key associated with the first computing device in order to obtain an encrypted message, and
  publish the encrypted message to the first channel.

9. The system of claim 8, wherein:
the portion of the first message that is encrypted using the device-specific encryption key comprises a payload of the first message.

10. The system of claim 1, wherein:
the second instructions, when executed, further cause the second computing device to:
  encrypt at least a portion of a second message of the one or more second messages using a device-specific encryption key associated with the first computing device in order to obtain an encrypted message, and
  publish the encrypted message to the second channel.

11. The system of claim 1, wherein:
the first instructions, when executed, further cause the first computing device to publish, to the first channel, a first message of the one or more first messages; and
the second instructions, when executed, cause the second computing device to publish, to the second channel, a second message of the one or more second messages.

12. The system of claim 11, wherein:
the first message comprises a request for a list of devices of the local network of interconnected devices that the second computing device determines to be associated with the first computing device; and
the second message comprises the list of devices.

13. The system of claim 11, wherein:
the first message comprises a request for a portion of a file stored by the second computing device; and
the second message comprises the portion of the file requested.

14. The system of claim 1, wherein:
the one or more first messages are a first type of message; and
the provisioning response further comprises third information indicating a third channel, provided by the message broker, to which the first computing device shall publish one or more third messages that are a second type of message different than the first type of message.

15. The system of claim 1, wherein:
the provisioning response further comprises a first address of a first server of the message broker and a second address of a second server of the message broker; and
the first instructions, when executed, further cause the first computing device to:
  connect to the first server at the first address before connecting to the second server, and
  connect, automatically, to the second server at the second address after the first computing device loses connectivity to the first server.

16. A method comprising:
receiving, by a first computing device and after a second computing device achieves a power-on state, a provisioning request wherein the second computing device is configured to connect a local network of interconnected devices to a wide area network;
generating, by the first computing device and after receiving the provisioning request, a provisioning response comprising:
  first information indicating a first channel, provided by a message broker that implements a publish-subscribe messaging protocol, to which the first computing device shall publish one or more first messages, and
  second information indicating a second channel, provided by the message broker, to which the second computing device shall publish one or more second messages;
transmitting, by the first computing device to the second computing device, the provisioning response wherein receipt of the provisioning response by the second computing device causes the second computing device to subscribe to the first channel;
subscribing, by the first computing device, to the second channel; and
publishing, by the first computing device to the first channel, a message of the one or more first messages.

17. The method of claim 16, further comprising:
transmitting, by the first computing device to a third computing device, the second information indicating the second channel to which the second computing device shall publish the one or more second messages; and wherein receipt of the second information by the third computing device causes the third computing device to subscribe to the second channel.

18. The method of claim 16, further comprising:
transmitting, by the first computing device to a third computing device, a device-specific encryption key associated with the second computing device.

19. The method of claim 16, further comprising:
receiving, by the first computing device from the second computing device, information indicating a plurality of message types that the second computing device shall publish.

20. The method of claim 16, further comprising:
receiving, by the first computing device, a message of the one or more second messages that the second computing device has published to the second channel; and
decrypting, by the first computing device and using a device-specific encryption key associated with the second computing device, at least a portion of the message that the second computing device has encrypted using the device-specific encryption key.

21. The method of claim 16, further comprising:
encrypting, by the first computing device and using a device-specific encryption key associated with the second computing device, at least a portion of a message of the one or more first messages in order to obtain an encrypted message; and
publishing, by the first computing device to the first channel, the encrypted message.

22. A method comprising:
achieving, by a first computing device configured to connect a local network of interconnected devices to a wide area network, a power-on state;
transmitting, by the first computing device to a second computing device and after achieving the power-on state, a provisioning request;
receiving, by the first computing device from the second computing device, a provisioning response comprising:
first information indicating a first channel to which the first computing device shall publish one or more first messages, and
second information indicating a second channel to which the second computing device shall publish one or more second messages;
subscribing, by the first computing device and after receiving the provisioning response, to the second channel; and
publishing, by the first computing device to the first channel, a message.

23. The method of claim 22, further comprising:
encrypting, by the first computing device and using a device-specific encryption key associated with the first computing device, at least a portion of a message of the one or more first messages to obtain an encrypted message; and
publishing, by the first computing device to the first channel, the encrypted message.

24. The method of claim 22, further comprising:
receiving, by the first computing device, a message of the one or more second messages published to the second channel; and
decrypting, by the first computing device and using a device-specific encryption key associated with the first computing device, at least a portion of the message that has been encrypted using the device-specific encryption key.

25. The method of claim 22, wherein:
the second computing device published the message to the second channel.

26. The method of claim 22, further comprising:
a third computing device published the message to the second channel.

27. The method of claim 22, further comprising:
transmitting, by the first computing device to the second computing device, information indicating a plurality of message types that the first computing device shall publish.

* * * * *